(12) United States Patent
Bergholtz

(10) Patent No.: US 9,208,422 B2
(45) Date of Patent: Dec. 8, 2015

(54) PACKAGING MATERIAL COMPRISING MAGNETISABLE PORTIONS

(75) Inventor: Lars Bergholtz, Höganäs (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 80 days.

(21) Appl. No.: 13/884,769

(22) PCT Filed: Sep. 29, 2011

(86) PCT No.: PCT/EP2011/067023
§ 371 (c)(1),
(2), (4) Date: May 10, 2013

(87) PCT Pub. No.: WO2012/072309
PCT Pub. Date: Jun. 7, 2012

(65) Prior Publication Data
US 2013/0228614 A1   Sep. 5, 2013

(30) Foreign Application Priority Data

Nov. 29, 2010 (SE) ........................ 1001145

(51) Int. Cl.
*B65D 5/42* (2006.01)
*B65D 5/06* (2006.01)
*G06K 19/06* (2006.01)
*B31B 1/74* (2006.01)
*B65D 85/72* (2006.01)

(52) U.S. Cl.
CPC ............ *G06K 19/06187* (2013.01); *B31B 1/74* (2013.01); *B65D 5/06* (2013.01); *B65D 5/42* (2013.01); *B65D 5/4212* (2013.01); *B65D 85/72* (2013.01); *B31B 2201/95* (2013.01); *B31B 2203/082* (2013.01); *B65D 2203/10* (2013.01); *Y10T 428/24934* (2015.01); *Y10T 428/31993* (2015.04)

(58) Field of Classification Search
None
See application file for complete search history.

(56) References Cited

U.S. PATENT DOCUMENTS 3,237,973 A * 3/1966 Rumberger ............... 428/900
3,878,367 A * 4/1975 Fayling et al. ............. 360/131
4,024,379 A   5/1977 Pfost et al.
(Continued)

FOREIGN PATENT DOCUMENTS

| CN | 1652930 A | 8/2005 |
|---|---|---|
| CN | 1812886 A | 8/2006 |

(Continued)

OTHER PUBLICATIONS

International Search Report (PCT/ISA/210) issued on May 14, 2012, by the European Patent Office as the International Searching Authority for International Application No. PCT/EP2011/067023.
(Continued)

*Primary Examiner* — Gary Elkins
(74) *Attorney, Agent, or Firm* — Buchanan Ingersoll & Rooney PC

(57) ABSTRACT

A packaging material comprising a plurality of magnetisable portions thereon comprising at least one detectable magnetisable portion per package to be formed from the packaging material is disclosed. At least one of the magnetisable portions provides a first magnetic mark carrying a magnetic field pattern.

4 Claims, 9 Drawing Sheets

(56) References Cited

U.S. PATENT DOCUMENTS

| | | | |
|---|---|---|---|
| 4,096,305 A * | 6/1978 | Wilkinson et al. | 428/182 |
| 4,427,481 A * | 1/1984 | Smith et al. | 156/306.6 |
| 5,206,065 A * | 4/1993 | Rippingale et al. | 428/98 |
| 5,237,540 A | 8/1993 | Malone | |
| 5,407,891 A * | 4/1995 | Matsushita et al. | 503/204 |
| 5,704,190 A * | 1/1998 | Kaneko et al. | 53/51 |
| 5,762,263 A * | 6/1998 | Chamberlain, IV | 229/132 |
| 6,204,763 B1 * | 3/2001 | Sone | 340/568.1 |
| 6,564,999 B1 * | 5/2003 | Saveliev et al. | 235/383 |
| 7,035,856 B1 * | 4/2006 | Morimoto | 705/7.12 |
| 7,254,883 B2 * | 8/2007 | Schmid et al. | 29/600 |
| 7,319,393 B2 * | 1/2008 | Forster | 340/572.1 |
| 7,333,015 B2 * | 2/2008 | Ekstrom | 340/545.6 |
| 7,758,938 B2 * | 7/2010 | Hseih et al. | 428/40.1 |
| 7,847,695 B2 * | 12/2010 | Ficker et al. | 340/572.1 |
| 8,196,841 B2 * | 6/2012 | Ingvert | 235/493 |
| 8,322,619 B2 * | 12/2012 | Sullivan et al. | 235/462.01 |
| 2004/0241394 A1 * | 12/2004 | Burrows | 428/195.1 |
| 2005/0287351 A1 | 12/2005 | Johansson et al. | |
| 2006/0032928 A1 * | 2/2006 | Schaedel | 235/494 |
| 2008/0035742 A1 | 2/2008 | Schaedel | |
| 2008/0309327 A1 | 12/2008 | Holmstrom | |
| 2009/0000250 A1 * | 1/2009 | Nilsson et al. | 53/396 |
| 2010/0012653 A1 * | 1/2010 | Ulrich et al. | 220/1.5 |
| 2010/0016137 A1 | 1/2010 | Benedetti et al. | |
| 2010/0139216 A1 | 6/2010 | Johansson et al. | |
| 2011/0162326 A1 | 7/2011 | Johansson et al. | |
| 2012/0067953 A1 | 3/2012 | Nilsson | |
| 2012/0070633 A1 | 3/2012 | Nilsson et al. | |
| 2012/0070634 A1 | 3/2012 | Holmstrom | |
| 2012/0070638 A1 | 3/2012 | Nilsson et al. | |
| 2012/0073242 A1 | 3/2012 | Nilsson et al. | |
| 2012/0074234 A1 | 3/2012 | Nilsson et al. | |
| 2012/0076995 A1 | 3/2012 | Nilsson et al. | |
| 2012/0077001 A1 | 3/2012 | Klint et al. | |
| 2012/0272619 A1 * | 11/2012 | Tavernari et al. | 53/412 |

FOREIGN PATENT DOCUMENTS

| | | |
|---|---|---|
| EP | 0 317 879 A1 | 5/1989 |
| EP | 0705759 A1 | 4/1996 |
| EP | 1493590 A1 | 1/2005 |
| JP | 56-49768 A | 5/1981 |
| JP | 01-312730 A | 12/1989 |
| JP | 1-1312730 A | 12/1989 |
| JP | 9-188357 A | 7/1997 |
| JP | 2005-525253 A | 8/2005 |
| JP | 2006-506285 A | 2/2006 |
| JP | 2008-532039 A | 8/2008 |
| JP | 2010-506806 A | 3/2010 |
| JP | 2010-208333 A | 9/2010 |
| WO | 97/24278 A1 | 7/1997 |
| WO | WO 03/095198 A1 | 11/2003 |
| WO | 2006/093448 A1 | 9/2006 |
| WO | WO 2006/093449 A1 | 9/2006 |
| WO | 2006/135315 A1 | 12/2006 |
| WO | WO 2006/135314 A1 | 12/2006 |
| WO | 2010/138055 A1 | 12/2010 |
| WO | WO 2010/138046 A1 | 12/2010 |
| WO | WO 2010/138047 A1 | 12/2010 |
| WO | WO 2010/138048 A1 | 12/2010 |
| WO | WO 2010-138049 A1 | 12/2010 |
| WO | WO 2010/138050 A1 | 12/2010 |
| WO | WO 2010/138051 A1 | 12/2010 |
| WO | WO 2010/138052 A1 | 12/2010 |
| WO | WO 2010/138053 A1 | 12/2010 |
| WO | WO 2010/138054 A1 | 12/2010 |
| WO | WO 2010/138055 A1 | 12/2010 |

OTHER PUBLICATIONS

Japanese Office Action issued on Jul. 21, 2015, by the Japanese Patent Office in corresponding Japanese Patent Application No. 2013-540275 and an English translation of the Japanese Office Action. X.

* cited by examiner

PACKAGING MATERIAL COMPRISING MAGNETISABLE PORTIONS

TECHNICAL FIELD

The present invention relates to a sheet or web of a packaging material comprising at least one detectable information-carrying mark per packaging container intended to be formed from said web or sheet. In particular the invention relates to a web or sheet of such a packaging material comprising a base layer of paper or paperboard and outer liquid tight layers of polyolefin for reforming into a packaging container for transport and handling of liquid and/or solid food. The invention also relates to a packaging container manufactured from a sheet or web of said packaging material through a forming, filling and sealing process. The invention also relates to a method for manufacturing of a web of packing material comprising at least one detectable information-carrying mark per packaging container (package) intended to be formed from said web. Furthermore, the invention relates to a method for forming a filled sealed package from a sheet or web of a packaging material comprising at least one detectable information-carrying mark per packaging package intended to be formed from said web or sheet, wherein information read from said information-carrying mark is used to control relevant process parameters for forming said packaging package.

BACKGROUND

Within packaging technology where a package is formed from a packaging material, it is known to supply the packaging material as individual sheets cut from a web before filling or as a web to be formed into a tube during the process of filling, sealing and forming a packaging container. Guiding marks, e.g. for optical reading has been provided to carry operation-related information to guide operations when said individual sheets or web is formed through folding and sealing to the packaging container. Such optical guiding marks are sometimes referred to as register marks ("bar codes"). The register mark for optical reading is provided during printing of the packing material, where e.g. decoration or product information is printed on the packaging material. A problem with such register marks is that they consume a non-negligible area of what becomes the exterior of the packaging container. Attempts have been made to reduce such undesirably consumed exterior surface by reducing the physical size of the mark. However since reducing the physical size is restricted to a lower critical limit size below which the mark is too small to be detectable with at least a minimum of required accuracy by means of available optical means.

EP 705759 A1 discloses the use of a magnetic mark in packaging material to store package relevant information. However, the magnetic marks do not allow precise adjustment of the packaging material in the filling machine, nor the transfer of substantial amount of data from the production site of the packaging material into the filling machine and beyond.
Objective An objective of the invention is therefore to provide an improved package based on a web of packaging material with magnetic marks.

A packaging material for such improved package is provided in the form of a web or individual blanks for reforming into packages according to known form/fill/seal principles to obtain formed, filled and sealed packaging containers for transport and handling of food. Well known examples of such packaging containers are Tetra Brik, Tetra Rex, Tetra Fino, Tetra Recart, Tetra Top (all of which are registered trademarks assigned to Tetra Pak), see PACKAGING'S ENCYCLOPEDIA 1987, pp 93 ff. for a more detailed information of shape and dimension of a typical example of a commercial Tetra Brik package. A common feature of most of packaging materials for these commercial packaging containers is that they comprise a rigid, but foldable base layer of paperboard and outer liquid-tight films or coatings of polyolefin, usually polyethylene on both sides of said base layer. In cases where the finished package is to be used for especially oxygen sensitive food, such as juice, wine, edible oil, the packaging material is supplemented with at least one additional layer of a material having the desired barrier properties to gases, in particular oxygen. One preferred such barrier layer is an aluminium foil (Al foil) through which the packaging material can be sealed by means of induction heating which is a rapid efficient heat sealing technique.

In order to facilitate forming through folding of the packaging material, said packaging material can be provided with a pattern of crease lines along which the material is intended to be folded when it is reformed into finished packaging containers. The crease lines are created during the production of the packaging material. It is also preferred to provide the packaging material with a unique print of aesthetic and/or informative character (so called décor) to be visually displayed on the outside of the package manufactured thereof.

A packaging material to be used for a package for transport and handling of food must of course be composed and configured so as to provide the best possible chemical as well as mechanical protection to the food contained therein, and a further demand on the laminate is that it shall enable manufacturing of consumer friendly packaging containers which are easy to open without the need to use an extra tool to get access to its content. The packaging material is therefore usually provided with an integral opening device, such as a pre-cut hole through which the package is intended to be emptied.

One conventional method for manufacturing a packaging material as described above includes along a first integrated converting line the steps of: passing a web of paperboard to and through a printing station in which a desired pattern of print of aesthetic and/or informative character is repeatedly applied on one surface of the paperboard, i.e on the surface which is intended to be facing outwardly when the packaging material subsequently is reformed into packages. The so printed web is passed forward to a creasing station immediately following or linked to printing station so as to provide the web with a repeatedly applied pattern of crease lines in alignment with the already applied pattern of print.

As suggested above, it often happens that the web is provided also with a pre-made opening device including a pre-cut hole through which the content of a filled packages is intended to be emptied. Such a hole can be cut either by means of a mechanical tool or by means of laser cutting. Mechanical cutting is usually made in an operation very close to the creasing operation, while laser cutting can be carried out in an operation both timely and physically separated from said creasing operation. Irrespective of manner of cutting, it is important that the cut hole is positioned in alignment with the pattern of crease lines so as to obtain a packaging container of high quality both in view of functionality and appearance.

The web is then rolled and moved to a second integrated converting line comprising several coating or lamination stations where the web in a first coating station is provided with an outer layer of polyolefin which is applied through extrusion coating on the printed surface of the paperboard. The web is passed further to a second coating or lamination station in which the opposite surface of the paperboard, i.e the surface which is intended to be facing inwardly when the packaging material is formed into packaging containers, is coated with an outer layer of polyolefin through extrusion coating. In case the packaging material is intended for packages for oxygen sensitive food, such as juice, wine, edible oil etc, a gas barrier layer, usually an aluminium foil (Al foil) is first laminated to said opposite surface before the outer layer of polyolefin is applied so as to prevent contact between the foil and the food to be included in the packaging container. The so coated and laminated web is finally rolled and moved to a third integral converting line for inspection, doctoring, slitting and similar mechanical operations on the web to bring the web into an acceptable condition for reforming into filled and sealed packages.

The present invention is based on the understanding that magnetic marking can be provided on a packaging material. In the present disclosure, it is suggested that one or more detectable magnetisable portions per intended package to be formed from the web is provided on the web, wherein the detectable magnetisable portions comprises magnetisable particles such that magnetic marking is enabled.

According to a first aspect, there is provided a packaging material comprising a plurality of magnetisable portions thereon comprising at least one detectable magnetisable portion per package to be formed from the packaging material, wherein at least one of the magnetisable portions provides a first magnetic mark carrying a magnetic field pattern.

The magnetic pattern of the first magnetic mark may be representing complex data. The material may define a transversal direction being parallel to an imaginary axis of a roll when a web of the material is spooled, and a longitudinal direction perpendicular to the transversal direction, wherein the magnetisable portion providing the first magnetic mark may comprise a strip essentially along the longitudinal direction of the web. The complex data may hold information from which the material can be uniquely identified, preferably information from which a part of the material where the magnetisable portion providing the magnetic mark is present can be uniquely identified. The complex data may be represented as a modulating scheme of the magnetic field of the magnetic pattern, wherein the modulating scheme may comprise any of a group comprising frequency shift keying, amplitude shift keying, quadrature amplitude modulation, and pulse width modulation. Preferably, said complex data are represented as a modulating scheme comprising phase shift keying which presently is considered to be the most robust and accurate one for the intended purposes.

Said first magnetic mark is preferably provided as early as possible in a converting line used to manufacture a packaging material to enable complete and individual recording of any events occurring along the whole converting line. Therefore said magnetic mark is applied and individually energised already in connection with a printing operation which usually is carried out as the first operation on a web of paperboard. Preferably, said first mark is printed directly on one surface of the paperboard in a manner so as to obtain at least one such mark per package to be produced from said web, wherein said at least one mark is printed like a stripe extending repeatedly interrupted in the longitudinal direction of the web.

In one aspect, said first individually coded magnetic mark can be used for traceability purposes. To this end magnetic detecting means (detector or reader) are provided along the physically separated, integral converting lines (see above) in communication with each operational station with the intention to detect passages of consecutive codes or ID so as to be able to record any detected operation faults or other events in close linkage to the respective codes in a database accessible for tracing. Not only faults, but also operational parameters, such as temperatures, coating amounts of polyolefin can be recorded and used for setting forming parameters (sealing temperatures for example) in a filling machine to save time for an operator. In a similar manner the database can also be used to save information about process conditions used to treat a product before filling etc. A specific application of the ID coding of the dynamic mark is in connection with finishing operations on the web, such as doctoring, where the mark can be used as control means to stop the web exactly where a converting-related fault has been recorded.

At least one of the magnetisable portions may provide a second magnetic mark carrying a magnetic field pattern aligned with at least one preparation feature for enhancing finishing of packages. The preparation feature may comprise any of a group comprising crease lines, openings, perforations, package boundary or sealing, beginning of web, end of web, positioning of optical mark, print for package outside. A distance between an area of a preparation feature and its aligned magnetic field mark may be at least 2 mm, preferably at least 5 mm, preferably at least 7 mm, preferably at least 10 mm.

At least one of the detectable magnetisable portions for each package to be formed may be positioned not more than 20%, preferably between 5 and 15% of the width of the material to form a package from a longitudinal edge of the material to form the package. The reason is that a conventional filling machine used to manufacture a packaging container according to forming/filling/sealing principles in which a tube is formed from a web of the packaging material usually is provided with an optical reader in a fixed position in view of the so formed tube. For easy access for maintenance and/or replacement, said reader is preferably positioned in a central position in direct opposition to a longitudinal overlap formed during tube forming. Such an optical reader has an effective operational window the width or extent of which is substantially dependent on the distance between the reader and the overlap. To secure a short distance and therefore an accurate optical reading (detection) of the mark said mark should be positioned as close as possible to the overlapping longitudinal edges of the formed tube, which in practice means that said mark shall be positioned within a length not exceeding 20% of the width of the material to form the package from the longitudinal edge thereof, preferably between 5 and 15%. Replacing an optical mark requiring an optical reader with a magnetisable information-carrying mark according to the invention also necessitate a replacement of the former optical reader with a magnetic reader which can be positioned in the same position and by using the already installed supporting means in the filling machine, without requiring any extra cost-demanding installation means.

The magnetic field pattern may comprises at least a first magnetic field peak having a first polarity and a second magnetic field peak having a second opposite polarity. The material may define a transversal direction being parallel to an imaginary axis of a roll when a web of the material is spooled, a longitudinal direction perpendicular to the transversal direction, and an imaginary line between a midpoint of the first peak and the second peak of the magnetic field pattern, wherein the magnetic field pattern may be arranged such that the angle between the imaginary line and the longitudinal direction is between −10 and 10 degrees, preferably between −5 and 5 degrees, preferably about 0 degrees. The peaks of the magnetic pattern may have a distribution forming a substantially constant magnetic field along a width of the magnetic pattern in a direction perpendicular to the imaginary line, and forming a strongly decreasing magnetic field outside the width of the magnetic pattern in the direction perpendicular to the imaginary line. The width may be at least 2 mm, preferably at least 4 mm, preferably at least 6 mm.

According to a further embodiment of the invention different marks are used on the same package. The packaging material comprises a plurality of magnetisable portions thereon comprising at least one detectable magnetisable portion per package to be formed from the packaging material, wherein, per package, at least one of the magnetisable portions provides a first magnetic mark carrying a magnetic field pattern, and another of the magnetisable portions provides a second magnetic mark carrying a magnetic field pattern.

The first magnetic mark is a master mark (register mark) such that operations for finishing the package is enabled to gain information on positioning of the part of the web intended to form the package. A master mark is typically used to position the web of packaging material during processing either during production or later during the forming and filling of packages from the packaging material.

The second magnetic mark is associated with a feature for enhancing finishing of packages such that an operation associated with the feature and to be performed for finishing the package is enabled to gain information on positioning of the part of the web intended to form the package, and/or the first magnetic mark may be associated with a feature for enhancing finishing of packages such that an operation associated with the feature and to be performed for finishing the package is enabled to gain information on positioning of the part of the web intended to form the package.

The magnetic fields of the first and/or second magnetic marks represent complex data. The packaging material defines a transversal direction being parallel to an imaginary axis of a roll when a web of the material is spooled, and a longitudinal direction perpendicular to the transversal direction, wherein at least one of the magnetisable portions may comprise a strip essentially along the longitudinal direction of the web, and the second magnetic mark may be provided by said strip. The complex data may hold information from which the material can be uniquely identified, preferably information from which a part of the material can be uniquely identified. The complex data may be represented as a modulating scheme of the magnetic field of the magnetic pattern, wherein the modulating scheme comprises any of a group comprising phase shift keying, frequency shift keying, amplitude shift keying, quadrature amplitude modulation, and pulse width modulation. The use of multitude of marks per package or a modulation scheme for the data per mark enhances the amount of data available per package without a need for a larger amount of magnetisable material being printed on a layer of the packaging material. This allows for an inexpensive provision of said marks. Furthermore, the print of the magnetisable material can remain the same, but the amount of data per package be increased without substantial investment.

According to another aspect of the invention, there is provided a packaging material comprising a plurality of magnetisable portions thereon comprising at least one detectable magnetisable portion per package to be formed from the packaging material. At least one of the magnetisable portions provides a magnetic mark carrying a magnetic field pattern. The magnetic field pattern comprises a first magnetic field peak having a first polarity and a second magnetic field peak having a second opposite polarity—can be inexpensively magnetised by a permanent magnet. It is advantageous for exact reading and positioning to keep the distance between the peaks low preferably below 20 min, best between 1 and 3 mm.

The packaging material defines a transversal direction being parallel to an imaginary axis of a roll when a web of the material is spooled, a longitudinal direction perpendicular to the transversal direction, and an imaginary line between a midpoint of the first peak and the second peak of the magnetic field pattern, wherein the magnetic field pattern is arranged such that the angle between the imaginary line and the longitudinal direction is between −10 and 10 degrees, preferably between −5 and 5 degrees, preferably about 0 degrees. The peaks of the magnetic pattern have a distribution forming a substantially constant magnetic field along a width of the magnetic pattern in a direction perpendicular to the imaginary line, and forming a strongly decreasing magnetic field outside the width of the magnetic pattern in the direction perpendicular to the imaginary line. The width may be at least 2 mm, preferably at least 4 mm, preferably at least 6 mm. A good detection of the mark in both directions is important for keeping good readability should the web slightly move off-center, but also for adjusting the web in longitudinal direction, orthogonal to the web movement. For the longitudinal direction a mark with a smaller width of the magnetic pattern and/or a sharp edge of the magnetic pattern provide an improved resolution of the. However, a broad magnetic field pattern or a slowly rising edge of said magnetic field pattern secure a better robustness for the reading of the mark.

The second magnetic field peak may be distributed such that it encircles the first peak in the plane of the material and has a second opposite polarity to the first magnetic field peak.

According to another aspect of the invention, there is provided a packaging material comprising a plurality of magnetisable portions thereon comprising at least one detectable magnetisable portion per package to be formed from the packaging material, and at least one preparation feature for enhancing finishing of packages, wherein the at least one preparation feature is aligned with a magnetic field mark in the at least one magnetisable portion.

The preparation feature comprises any of a group comprising crease lines, openings, perforations, package boundary or sealing, beginning of web, end of web, positioning of optical mark, detectable print (décor) on the package. The mark should not interfere with the preparation feature to avoid destruction of the mark during such preparation. The magnetisable portion is produced during an early phase of the production process of the packaging material. A later compression, bending or stretching of the packaging material exactly at the position of the later mark may compromise its quality.

According to further improvement of the invention, the distance between an area of the preparation feature and its aligned magnetic field mark may be at least 2 mm, preferably at least 5 mm, preferably at least 7 mm, preferably at least 10 mm. Portion packages have a limited surface, but also the highest speeds in the filling machine. Large distances secure good marks and few reading errors; smaller distances can be used with more elaborate package shapes and additional functionality on the package.

At least one of the magnetic marks for each package to be formed may be positioned not more than 20%, preferably between 5 and 15% of the width of the material to form a package from a longitudinal edge of the material to form the package. The reason is that a conventional filling machine used to manufacture a packaging container according to forming/filling/sealing principles in which a tube is formed from a web of the packaging material usually is provided with an optical reader in a fixed position in view of the so formed tube. For easy access for maintenance and/or replacement, said reader is preferably positioned in a central position in direct opposition to a longitudinal overlap formed during tube forming. Such an optical reader has an effective operational window the width or extent of which is substantially dependent on the distance between the reader and the overlap. To secure a short distance and therefore an accurate optical reading (detection) of the mark said mark should be positioned as close as possible to the overlapping longitudinal edges of the formed tube, which in practice means that said mark shall be positioned within a length not exceeding 20% of the width of the material to form the package from the longitudinal edge thereof, preferably between 5 and 15%. Replacing an optical mark requiring an optical reader with a magnetisable information-carrying mark according to the invention also necessitate a replacement of the former optical reader with a magnetic reader which can be positioned in the same position and by using the already installed supporting means in the filling machine, without requiring any extra cost-demanding installation means.

According to another aspect of the invention, there is provided a packaging material comprising a plurality of magnetisable portions thereon, being provided as at least one detectable magnetisable portion per package to be formed from the packaging material, the detectable magnetisable portions comprising magnetisable particles.

The detectable magnetisable portion may be essentially of a geometrical shape chosen from the group consisting of rectangular, square, circular, oval and elongated shape. At least one of the detectable magnetisable portions may be intended for magnetic position marking and may have an area less than 250 mm2, preferably less than 150 mm2, preferably less than 25 mm2. Smaller detectable magnetisable portions requires less magnetisable particle in production, but higher precision at the step to magnetise the particles during production. Larger detectable magnetisable portions are more forgiving during magnetisation and do not necessitate the same quality of alignment of the web during production.

The width of the magnetic mark is related to the magnetic reader, see WO2006093449 A1 for an exhaustive description of a reader which could be used. Potentially many of such readers are used in a single filling machine. Small compact readers are needed to be used in the filling machine to support the package production as a register control (position the web for cap application, sealing or cutting), tube twisting correction or splicing. There is little space available in the filling machine to mount the readers. Small but robust magnetic marks are preferable. Some, but not too much extra surface is given to the magnetisable portions onto which the magnetisation will be performed to produce the magnetic mark.

The detectable magnetisable portions may comprise magnetisable particles of an amount between 0.5 and 4 g per m2 print area, preferably between 1.5 and 4 g per m2, preferably about 2 g per m2.

The packaging material defines a transversal direction being parallel to an imaginary axis of a roll when a web of the material is spooled, and a longitudinal direction perpendicular to the transversal direction, wherein at least one of the magnetisable portions may comprise a strip essentially along the longitudinal direction of the web. The strip comprise piecewise divided parts, wherein one part is present for each package to be formed from the packing material. A division between the parts may be positioned such that sealing of the package to be formed from the packing material is enabled at the position of the division. The strip may comprise a magnetic mark indicating a predetermined distance to the intended position of sealing. The strip is furthermore the preferable location of any other mark containing information relating to the packaging material, it's composition, it's intended purpose or ordering entity.

The detectable magnetisable portions may be provided as prints which are made by magnetisable ink comprising magnetisable particles, a solvent and a binder. The magnetisable particles may by chosen from the group consisting of maghemite and hematite. The binder may be chosen from the group consisting of acrylate, acrylics such as styrene acrylic copolymer, polyurethane, nitrocellulose, polyamide and latex. The binder may comprise two of the group, wherein one serves as a disperant such that the magnetisable particles are evenly dispersed in the ink and the other serves as an adhesive to the packaging material. The amount of binder may be between 20 and 60 percent of weight of the ink, preferably between 40 and 60 percent, preferably between 50 and 55 percent. The ink may further comprise additives, such as waxes and/or antifoaming agent. The waxes may comprise any of a group comprising polyethylene, polypropylene, silicone, polyamide, ethylene vinyl acetate, ethylene butyl acetate, ethylene acrylic acid and polytetrafluoro ethylene. The antifoaming agent may comprise silicone or mineral oil. The solvent may comprise any of a group comprising ethanol, ethylic acetate, water, iso-propanol, glycol, or a retarder solvent. The amount of magnetisable particles may be between 15 and 40 percent by weight of the ink, preferably 30-35 percent by weight. The size of the magnetisable particles may be between 0.1 and 2.5 µm, preferably between 0.1 and 0.8 µm or preferably between 0.4 and 1.5 µm, preferably about 0.3 µm or preferably about 1 µm.

According to another embodiment of the invention the packaging material comprises a plurality of magnetisable portions of magnetisable particles being provided on the side of the paper layer intended to face towards the interior of the package. The magnetisable portions are typically of a dark colour. Inside print will reduce the visibility of the detectable magnetisable portions or amount of whitening substances being introduce into the packaging material.

The packaging material comprises a layer of paper and a layer of plastic coating, and the detectable magnetisable portions are provided on the layer of paper. The at least one detectable magnetisable portion may be printed on the side of the paper layer intended to face to the interior of the package. The laminate comprises further a metal foil layer of a non-ferromagnetic metal such that the magnetisable portion is electromagnetically accessible through the metal foil. Due to that choice no negative influence of the metal foil on the magnetisation will be observed.

The prints may be made by a magnetisable ink comprising magnetisable particles, a solvent and a binder. The magnetisable particles may be chosen from the group consisting of magnetite and maghemite. The binder may be chosen from the group consisting of acrylate, acrylics such as styrene acrylic copolymer, polyurethane, nitrocellulose, polyamide and latex. The binder may comprise two of the group, wherein one serves as a dispersant such that the magnetisable particles are evenly dispersed in the ink and the other serves as an adhesive to the packaging material. The amount of binder may be between 20 and 60 percent of weight of the ink, preferably between 40 and 60 percent, preferably between 50 and 55 percent. The ink may further comprise additives, such as waxes and/or antifoaming agent. The waxes may comprise any of a group comprising polyethylene, polypropylene, silicone, polyamide, ethylene vinyl acetate, ethylene butyl acetate, ethylene acrylic acid and polytetrafluoro ethylene. The antifoaming agent may comprise silicone or mineral oil. The solvent may comprise any of a group comprising ethanol, ethylic acetate, water, iso-propanol, glycol, or a retarder solvent. The amount of magnetisable particles may be between 15 and 40 percent by weight of the ink, preferably 30-35 percent by weight. The size of the magnetisable particles may be between 0.1 and 2.5 μm, preferably between 0.1 and 0.8 μm or preferably between 0.4 and 1.5 μm, preferably about 0.3 μm or preferably about 1 μm.

According to a first aspect, there is provided a magnetisable ink suitable for a packing material for forming food packages, comprising magnetisable particles; a solvent; and a binder.

In a preferred embodiment the magnetisable ink is adapted for high speed printing of a web of a packaging material comprising a base layer of paper or paperboard, in which said magnetisable ink is suitable for printing directly on the paper or paperboard layer. In particular, said magnetisable ink is adapted to be printed on the surface of said paper or paperboard layer which is intended to be facing towards the interior of a food package manufactured from said packaging material. The magnetisable particles may be chosen from the group consisting of maghemite and hematite.

The binder may be chosen from the group consisting of acrylate, acrylics such as styrene acrylic copolymer, polyurethane, nitrocellulose, polyamide and latex. The binder may comprise two of the group, wherein one serves as a dispersant such that the magnetisable particles are evenly dispersed in the ink and the other serves as an adhesive to the material. The amount of binder may be between 20 and 60 percent of weight of the ink, preferably between 40 and 60 percent, preferably between 50 and 55 percent.

The magnetisable ink may further comprise additives, such as waxes and/or antifoaming agent. The waxes may comprise any of a group comprising carnauba, paraffin, polyethylene, polypropylene, silicone, polyamide, ethylene vinyl acetate, ethylene butyl acetate, ethylene acrylic acid and polytetrafluoro ethylene. The antifoaming agent may comprise polyglycol, mineral oil, polysiloxanes, hydrophobic silica, silicone or mineral oil. The solvent may comprise any of a group comprising ethoxy propanol, n-propanol, ethanol, ethylic acetate, water, iso-propanol, glycol, or a retarder solvent. The amount of magnetisable particles may be between 15 and 40 percent by weight of the ink, preferably 30-35 percent by weight.

The size of the magnetisable particles may be between 0.1 and 2.5 μm, preferably between 0.1 and 0.8 μm or preferably between 0.4 and 1.5 μm, preferably about 0.3 μm or preferably about 1 μm.

Applications

The improved packaging material can be applied in the filling machine to enable additional machine functions or to improve the precision of machine function thereby improving the quality and appearance of the produced package and reducing waste.

A packaging material comprises according to a further embodiment of the invention a plurality of magnetisable portions with at least one detectable magnetisable portion per package to be formed from the packaging material The detectable magnetisable portions comprising magnetisable particles, wherein at least one of the magnetisable portions provides a magnetic mark carrying a magnetic field pattern enabling position determination such that upon splicing a first and a second web of such material, the first and second webs are enabled to be aligned by using determined positions from respective web. Splices between two reels of packaging material can be executed with high precision and minimal waste.

The marks for improved splicing can be generated only at the ends of a web of the material or periodically throughout the web.

Furthermore, defining a transversal direction being parallel to an imaginary axis of a roll when a web of the material is spooled, and a longitudinal direction perpendicular to the transversal direction, wherein the alignment of the webs in the longitudinal direction is based on the periodicity of the packages to be formed from the packaging material and the determined position information. Using multiple marks for positioning the web further improves the precision.

The invention can be advantageously be used in the filling machine to detect and correct the twisting of the tube of web-like packaging material before sealing and cutting. A web-like packaging material to be reformed into a tube to be sealed at one end, filled with content, sealed again to enclose the content, cut, and formed to a package, comprises a plurality of magnetisable portions. During production of the packaging material at least one magnetic mark is created per package to be formed from the packaging material. One or more of these magnetisable portions provide a first magnetic mark carrying a magnetic field pattern with accurate position information through which any twist of the formed tube can be detected and corrected.

According to another improvement, the positioning of the mark on the web allows for high precision control of the web during operations with varying web speeds. The packaging material comprises a plurality of magnetic marks printed with at least one magnetic mark per package to be formed from the packaging material. Said at least one magnetic mark is aligned with a preparation feature associated with an operation to be made to finish packages. One magnetic mark is positioned on the material such that relative speed between the material and means for reading the magnetic mark is not zero, but also well below the maximum speed the web might reach in the filling machine. The relative speed in an indexing operation varies between zero and a relatively high speed during the production of portion packages in a high speed filling machine which can produce up to 24.000 packages per hour. The reader is fixed in the filling machine at a given position relative to the work station which is in operation once the web is stopped. The mark is advantageously positioned at the web at positions which correspond to the reader position where the web passes at low speeds.

In one embodiment of the invention there is provided a packaging material comprising a magnetic mark providing a magnetic field pattern and being aligned with an operation for applying an opening device on the packaging material, wherein said magnetic mark is positioned on the material such that relative speed between the material and reader is low and preferably substantially constant.

The magnetic field pattern may comprise a first magnetic field peak having a first polarity and a second magnetic field peak having a second opposite polarity. The material may define a transversal direction being parallel to an imaginary axis of a roll when a web of the material is spooled, a longitudinal direction perpendicular to the transversal direction, and an imaginary line between a midpoint of the first peak and the second peak of the magnetic field pattern, wherein the magnetic field pattern may be arranged such that the angle between the imaginary line and the longitudinal direction is between −10 and 10 degrees, preferably between −5 and 5 degrees, preferably about 0 degrees. The peaks of the magnetic pattern may have a distribution forming a substantially constant magnetic field along a width of the magnetic pattern in a direction perpendicular to the imaginary line, and forming a strongly decreasing magnetic field outside the width of the magnetic pattern in the direction perpendicular to the imaginary line. The width may be at least 2 mm, preferably at least 4 mm, preferably at least 6 mm. To be able to combine this advantageous embodiment of the mark and its position with other application, the magnetic field pattern may comprise a first magnetic field peak having a first polarity and a second magnetic field peak being distributed such that it encircles the first peak and having a second opposite polarity.

The relative speed shall be zero at writing of the magnetic mark, and may be non-zero at reading of the magnetic mark. Thus, at writing of the magnetic mark, there is no slip between the writing means and the packaging material (as it is the case in a roller which provides the packaging material with crease lines), which implies that the magnetic mark is accurately assigned. At reading of the magnetic mark, there is a movement between the reading means and the magnetic mark should be such that the pattern of the magnetic mark can be properly detected. In case where the packaging material is intended for manufacturing of packages by means of a filling machine operating in an indexing manner said at least one magnetic mark is preferably located on the packaging material such that it is detected when the travelling speed of the packaging material is below 50% of its maximum value to obtain a good detection of the magnetic mark.

According to a further improvement, the mark is used by a method to adjust and position the web moving at various speeds, as it is the case if the web is moved and stopped in indexing activities. The method comprises controlling a relative speed between reading means and the material to be non-zero. Preferably, the relative speed between the reading means and the packaging material is controlled to be below 50% of its maximum value in case the packaging material is traveling in a cycling or indexing manner through a packaging machine of the kind which forms, fills and seals packages in a continuous manner from the packaging material passing therethrough. The controlling of the relative speed may comprise providing a slacking portion of the material both before and after the reading position such that speed at the writing position is enabled to be constant at instant of reading irrespective of general speed variations of the material.

The magnetic field of the magnetic marks needs to be strong enough to be read with robustness, but is also low, preferably in the range of 90-240 MSS. Having such field strength the magnetic mark will not be permanently altered by magnetic field disturbances <1000 µT.

Maximum magnetic field fluctuations from one magnetic mark to the next one are within +/−15 MSS within a packaging material. MSS is a unit of magnetic field strength measured as the parallel magnetic field 0.7 mm apart from the centre of a magnetic mark at the mark's side facing towards its magnetisation. The measurement value is related to the test method I025.307. That low field strength is securing a minimum impact on the food filled into the package and the working environing during production of the packaging material and the package.

DETAILED DESCRIPTION

Figure 1:
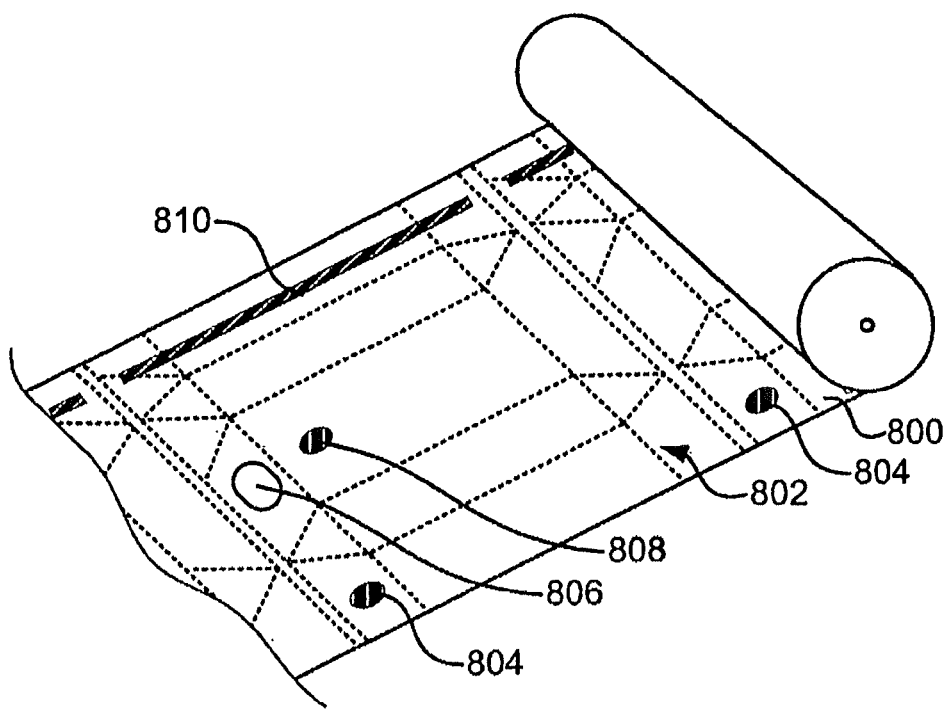
FIG. 1 schematically illustrates a web of packaging material according to an embodiment.

A web of packaging material, such as a laminate, comprises a plurality of magnetisable portions thereon, as illustrated in FIG. 1. The web comprises at least one detectable magnetisable portion per package to be formed from the packaging material. Further, at least one preparation feature for enhancing finishing of packages is provided by the web. The at least one preparation feature is aligned with a magnetic field mark in the at least one magnetisable portion. For example, as illustrated in FIG. 1, crease lines are made in the web for enabling a swift and reliable finishing of the package. Upon making the crease lines, a mark, formed as a predefined magnetic field, in the magnetisable portion simultaneously with the making of the crease lines. The mechanism for making the crease lines, i.e. rolls with patterned grooves/protrusions, can be provided with a magnetising element. The magnetic mark will then be ensured to be aligned with the crease line making operation. The magnetising element can be a permanent magnet, or an electromagnet, for providing the magnetic field mark. When the magnet provided at the periphery of a crease roll comes in close vicinity of the magnetisable portion, the magnetisable particles of the magnetisable portion will be magnetised, and a magnetic field pattern will remain at the magnetisable portion. Thus, a magnetic field mark is provided. Preferably, the magnetisable portion is slightly larger than the geometric size of the magnetic field mark, i.e. the part of the magnetisable portion having a remaining magnetism. Thereby, the alignment of the magnetisable portion is not crucial as the magnetic field mark will be the element providing an accurate position, and not the print of the magnetisable portion itself. By provision of a suitable magnetic pattern, the accurate magnetic field mark can also be accurately read, as will be discussed further below.

The preparation feature can be other than provision of crease lines, such as providing openings, perforations, etc. The alignment follows the same principle, i.e. that the magnetising portion is provided at the mechanism providing the preparation feature such that the alignment will be inherent because of the structure.

The application of the magnetising element in the mechanism performing the preparation feature may arise a few issues. The magnetising element may for example not be provided at a position where the preparation feature demands a mechanical interaction with the packaging material, such as forming a crease line or punching a hole. Therefore, there is preferably provided a distance between an area of such a preparation feature and its aligned magnetic field mark. Further, the tool performing the interaction as mentioned above may be made of a ferromagnetic material. To improve the application of the magnetic field mark, the magnetising element may need to be provided with a holding or mounting means made of a non-ferromagnetic material, such as aluminium, wherein the distance may be further increased. Thus, depending on the preparation feature operation, and the tool for performing it, the distance is preferably for example at least 2 mm, at least 5 mm, at least 7 mm, or at least 10 mm.

As several operations performing feature preparations, it is preferable that each such operation has its aligned magnetic field mark. Those different magnetic field marks are each preferably made in a respective magnetisable portion adapted in position for the operation. As some operations may be interacting, one operation can use a magnetic field mark made by another operation as a master mark, or there may be provided a certain dedicated master mark that is not inherently aligned with any feature preparation operation, which thus only is used for reference by later performed operations.

Other magnetic field marks may hold complex data, and can for example be provided as long rectangular detectable magnetisable portions, i.e. as strips. The strips can be provided along the entire web, with or without interruptions at parts intended to be cut upon finishing the packages. The magnetic field marks holding complex data can for example provide a unique code from which the web, and also the part of the web, can be identified. The complex data can also give position information, indications for the finishing of the package, etc.

FIG. 1 illustrates an example of a web 800 comprising crease lines 802 and a magnetisable portion 804 holding position information for the crease lines by an aligned magnetic field mark. The web 800 also comprises a punched hole 806 for each package to be formed, and a magnetisable portion 808 holding position information for the respective punched hole 806 by an aligned magnetic field mark. This magnetic field mark can for example be used upon moulding a re-closable opening on the package upon finishing. The web 800 also comprises a strip 810 holding complex data, for example as elucidated above.

A further position information can be package boundary or sealing, where an operation is for dividing the web into the parts forming the package, or for the sealing of respective package. A further position information, that the magnetisable portion can hold, is magnetic position marks at ends of a web of the packaging material, i.e. beginning of web and/or end of web, such that, at splicing of the webs, the splice is enabled to be aligned.

A further position information is positioning of an optical mark, which may beneficial compatibility for packaging machines having either optical reading or magnetic reading of positioning information. Preferably, the position of the detectable magnetisable portion holding this information is positioned similar to the optical mark, but on the side that is intended to become the inside of the package. Since the optical mark normally is provided on the part intended to form the bottom of the package, the corresponding magnetisable portion is positioned accordingly. A magnetic mark at this magnetisable portion is thus enabled to provide the similar information as the optical mark, and the optical reader of a packaging machine can thus simply be replaced with a magnetic reader. In practise, no optical mark is thus necessary if the optical readers are replaced by magnetic readers, and the magnetic mark takes the place of the optical mark as described above. In that case, the compatibility lies in the sense of the same mounting position of the readers in the packaging machine.

A further position information can be for a print for the package outside. This position information can be beneficial for ensuring proper alignment of the print with the package, and with other feature preparations of the package.

Upon making the magnetic field mark, it can be beneficial that the means for writing the magnetic field mark, e.g. a permanent magnet or a coil arrangement, has no or little relative movement, or at least an approximately constant relative movement to the magnetisable portion. This is achieved for example by integrating the writing means in e.g. rolls for making the crease lines, wherein there is no relative movement since the periphery of the rolls and the web moves by the same speed in the same direction. Another way of achieving no or little relative movement, or at least an approximately constant relative movement to the magnetisable portion is to control the movement at the position of the writing. This can be done by having a slacking portion of the web both before and after the writing position such that speed at this position can be controlled irrespective of the speed of the web before and after that position. The slack can be achieved by letting the web move along a wave-formed path where the sizes of the waves are adaptable to give a variable slack. Thus, during the writing operation, the speed can be controllable at the writing position, and the web is accelerated or decelerated between the writing operations to adapt to the average speed of the web.

At least one of the detectable magnetisable portions for each package to be formed can be positioned not more than 20%, preferably between 5 and 15% of the width of the material to form a package from a longitudinal edge of the material to form the package. A magnetic field mark at such detectable magnetisable portions can then be used for controlling twisting of the material when forming the package. The forming of the package is normally made by forming some kind of tube which then is sealed in some way at its ends and formed into the desired shape. The tube can then be unintentionally twisted, which can jeopardize the forming of the package. Therefore, such a magnetic field mark can help to control any twisting of the tube to ensure forming of the package. By having these magnetic marks relatively close to the longitudinal edges to be joined to form the tube, the control is further enhanced since the reading of the magnetic field marks can be made from the side of the package where the joining takes place.

Considering a web of packaging material comprising a plurality of magnetisable portions thereon, wherein at least one detectable magnetisable portion per package to be formed from the packaging material is comprised, at least one of the magnetisable portions can provide a magnetic mark carrying a magnetic field pattern. Thus, the magnetic mark becomes an information carrier. The information carried is geometrical in the sense that it is made on a particular position on the web, which is maintained through different processing steps, from manufacturing of the web to the finishing of the package. The information can also be in the sense of a pattern of the magnetic field, which can be a rather simple pattern for reliable position detection, or a more complex pattern for carrying complex data.

Figure 2:
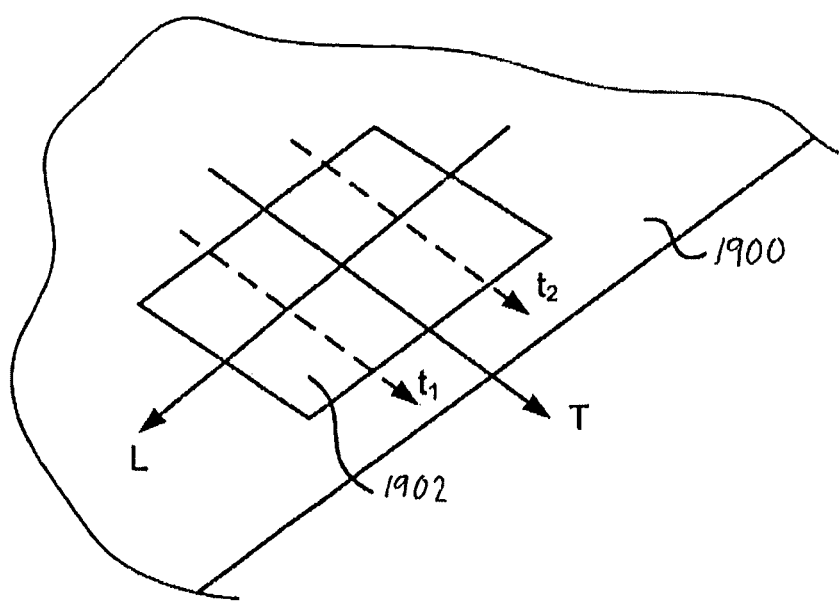
FIG. 2 schematically illustrates a magnetisable portion according to an embodiment.

Some examples of magnetic field patterns will be discussed with reference to FIG. 2, which illustrates a part of a web 1900 of packaging material with a magnetisable portion 1902. A transversal direction T, defined as being parallel to an imaginary axis of a roll when the web is spooled, and a longitudinal direction L perpendicular to the transversal direction can be defined, and transversal lines $t_1$ and $t_2$ are assigned for illustration of exemplary magnetic fields in FIGS. 3 and 4.

Figure 3A:
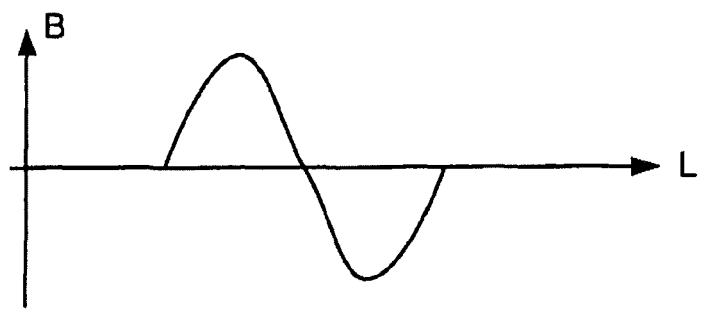
FIGS. 3a to 3c are diagrams illustrating magnetic field pattern according to an embodiment.
Figure 3B:
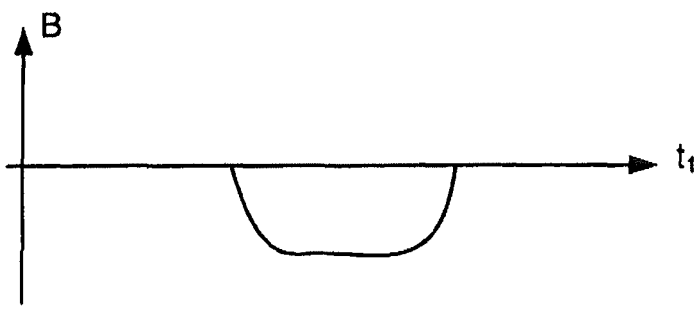
Figure 3C:
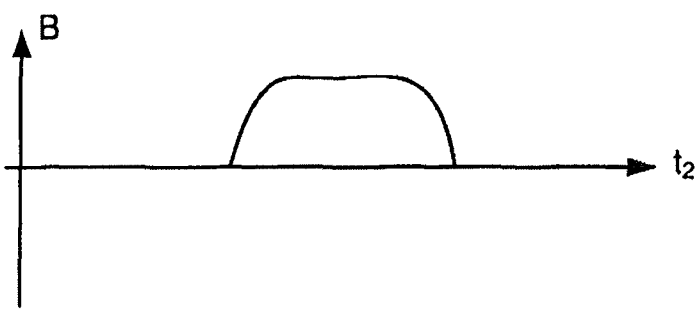

The magnetic field pattern comprises a first magnetic field peak having a first polarity and a second magnetic field peak having a second opposite polarity. FIG. 3 illustrates an example of this, where FIG. 3a is a diagram illustrating the magnetic field pattern along the longitudinal direction L, FIG. 3b is a diagram illustrating the magnetic field pattern along line $t_1$, and FIG. 3c is a diagram illustrating the magnetic field pattern along line $t_2$. Such a magnetic field pattern can be achieved by a single magnet, e.g. a permanent magnet having a north and a south pole, being arranged close to the magnetisable portion during application of the magnetic mark, wherein the remaining magnetic field of the magnetic particles of the magnetic ink of the magnetisable portion becomes for example like the one illustrated by FIG. 3. The position in the longitudinal direction L is then preferably detected by observing the shift of the magnetic field, i.e. the zero-crossing, which will provide a very accurate position indication in the longitudinal direction L. The position in the transversal direction T is preferably detected by observing the flanks of the magnetic field, e.g. by differential measurements technique, which will enable accurate tracking in the transversal direction T.

The pattern illustrated in FIG. 3 is perfectly aligned with the directions T and L. However, such a perfect alignment is not necessary. Considering an imaginary line between a midpoint of the first peak and the second peak of the magnetic field pattern, the magnetic field pattern can be arranged such that the angle between the imaginary line and the longitudinal direction L is between −10 and 10 degrees. In a preferred embodiment, the angle is between −5 and 5 degrees. For many applications however, the angle is preferably about 0 degrees as illustrated in FIG. 3. The peaks of the magnetic pattern have a distribution forming a substantially constant magnetic field along a width of the magnetic pattern in a direction perpendicular to the imaginary line, and forming a strongly decreasing magnetic field outside the width of the magnetic pattern in the direction perpendicular to the imaginary line, e.g. as illustrated in FIGS. 3b and 3c. The width is preferably at least 2 mm to enable detection of the flanks without interference. For higher reliability, the width is preferably at least 4 mm, and for some applications preferably at least 6 mm.

Figure 4A:
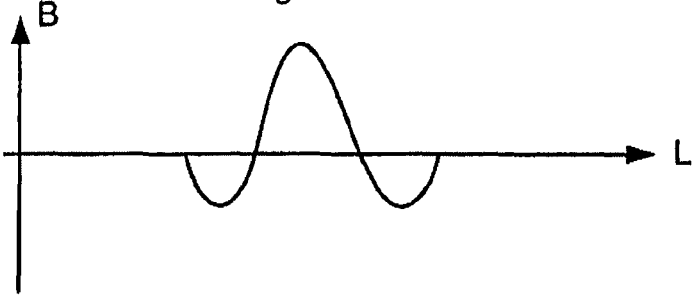
FIGS. 4a and 4b are diagrams illustrating magnetic field pattern according to an embodiment.
Figure 4B:
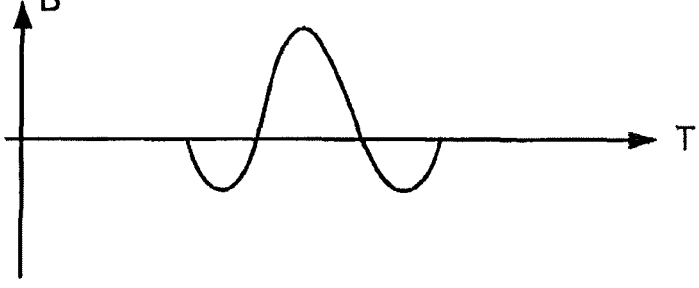

According to another embodiment of assignment of magnetic field pattern, as is illustrated in FIG. 4, the magnetic field pattern comprises a first magnetic field peak having a first polarity and a second magnetic field peak being distributed such that it encircles the first peak and having a second opposite polarity. Observing this magnetic field pattern in directions T and L will show the symmetric properties of the magnetic field pattern. Thus, detection according to the same principle can be made in any direction. For example, the two zero-crossings of the magnetic field can be observed using differential measurement technology. Another example is simply observing the main center peak of the magnetic field pattern.

Figure 5A:
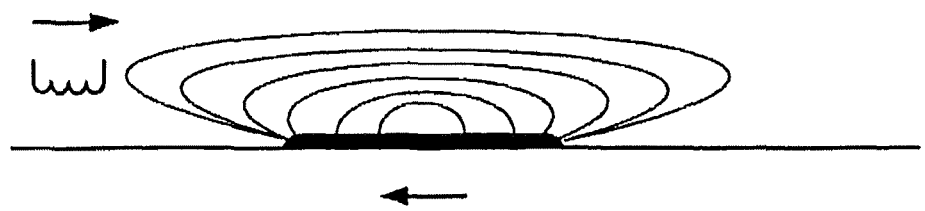
FIGS. 5a to 5c schematically illustrate reading of a magnetic field pattern according to embodiments.
Figure 5B:
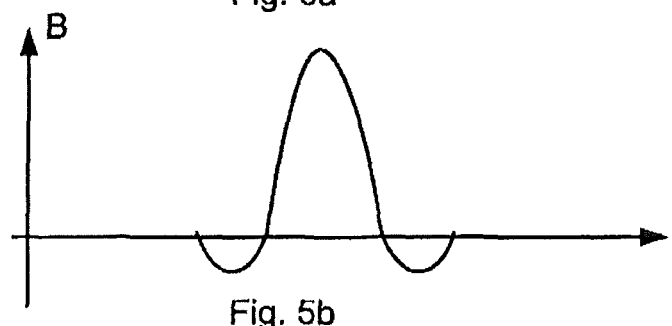
Figure 5C:
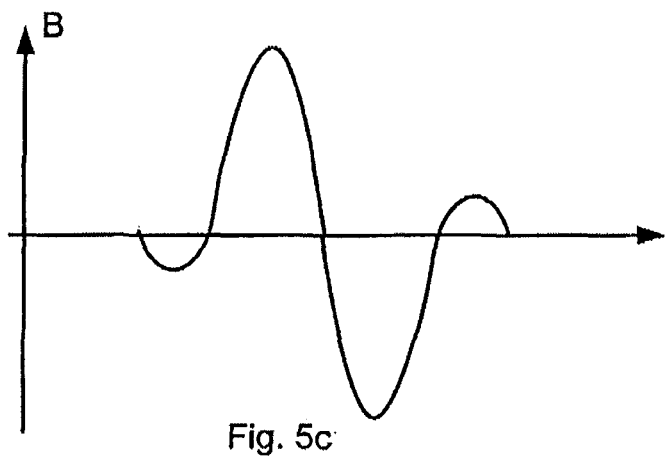

In practise, when reading a magnetic mark, the reading means, such as a coil arrangement, passes relative to the packaging material, the magnetic field lines from a magnetic mark, as illustrated in FIG. 5a, having its poles in the direction of the relative movement will provide a reading like illustrated in FIG. 5b. By providing two reading means slightly separated in the direction of the relative movement and taking a differential signal from them, the reading will instead be like illustrated in FIG. 5c. From this reading, a less error prone result of detecting a position can be achieved. Also, a magnetic mark as the one illustrated in FIG. 5a can be arranged to provide one bit of information by selecting the direction of the polarity of the magnetic mark in relation to the material. The readings will then be mirrored compared to the illustrations of FIGS. 5b and 5c. The one bit information can for example indicate a type of preparation feature of the material which the magnetic mark is aligned with.

A web of packaging material comprising a plurality of magnetisable portions thereon, with at least one detectable magnetisable portion per package to be formed from the packaging material can carry more or less complex information in its magnetisable portions. Considering that at least one of the magnetisable portions provides a magnetic mark carrying a magnetic field pattern, the magnetic field pattern can provide information both in the way the pattern has, and in the position it has. At least one of the plurality of magnetisable portions can provide a magnetic mark carrying a further magnetic pattern representing complex data, and even further magnetic marks can be provided for carrying information.

By defining a transversal direction T being parallel to an imaginary axis of a roll when the web is spooled, and a longitudinal direction L perpendicular to the transversal direction, the second magnetisable portion can comprise a strip essentially along the longitudinal direction T of the web. Such a strip is suitable for carrying complex data. For example, the complex data can hold information from which the web can be uniquely identified, and even a part of the web can be uniquely identified. The data can be a description of the web and/or the part of the web, or an identifier from which the description can be accessed from a database if the identifier is known.

Figure 6:
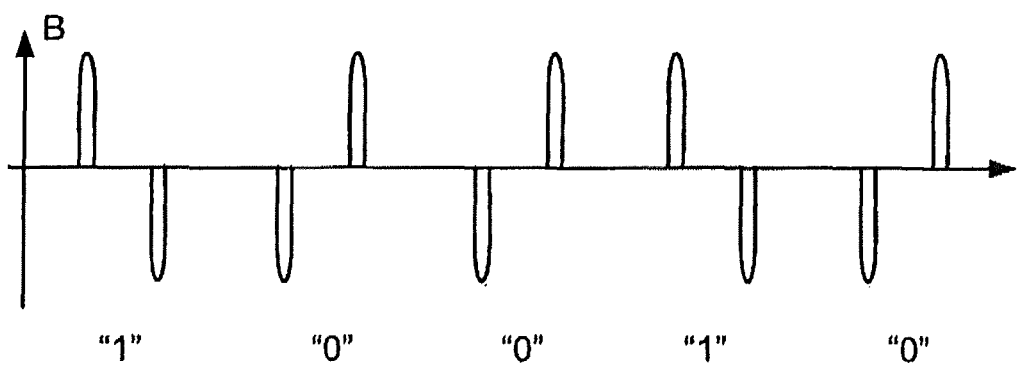
FIG. 6 is a diagram illustrating modulation of complex data to a magnetic field pattern according to an embodiment.

The complex data can be represented as a modulating scheme of the magnetic field of the magnetic pattern. The modulating scheme can be any of phase shift keying, frequency shift keying, amplitude shift keying, quadrature amplitude modulation, and pulse width modulation. FIG. 6 illustrates an exemplary modulation of the magnetic field for representing a digital sequence by phase shift keying which presently is the preferred modulation due to its high robustness and accuracy for the intended purposes according to the invention.

Figure 7:
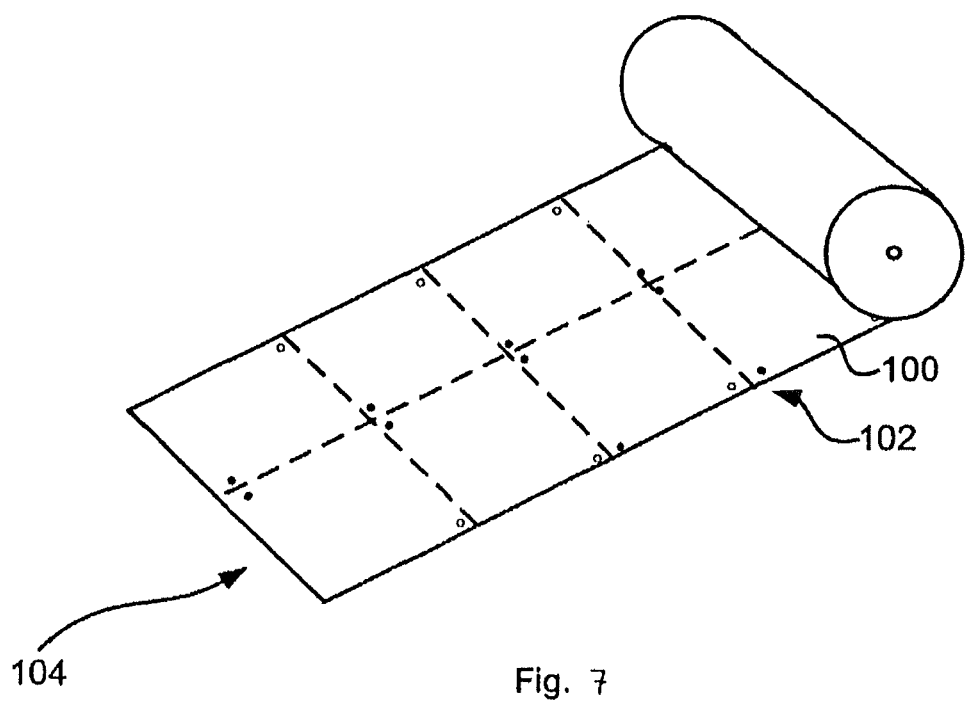
FIG. 7 schematically illustrates a web of packaging material according to an embodiment.

FIG. 7 illustrates web 100 of packaging material, where a plurality of magnetisable portions 102 are provided. The magnetisable portions are preferably distributed upon printing them such that there is at least one magnetisable portion 102 per package 104 to be formed from the packaging material. The dashed lines are imaginary and are intended to show the plurality of parts that will form the packages. For reducing the consumption of the magnetic material, i.e. magnetisable ink consumption, the magnetisable portions are provided as detectable magnetisable portions or the like at parts where magnetic marks are intended to be positioned. Since there is a limited precision in positioning between printing and the assignment of the magnetic mark, cf. the problem with optical marks, the detectable magnetisable portions are preferably slightly larger than the actual size needed for the magnetic mark. Thus, any reasonable deviation can be handled. The detectable magnetisable portions are thus provided with magnetisable particles, which can be provided with magnetic marks, and, as will be further elucidated below, depending on the form and size of the detectable magnetisable portions, be provided with more complex information by modulated magnetisation. The packaging material is preferably a laminate, or a single layer material such as a polymer material.

Figure 8:
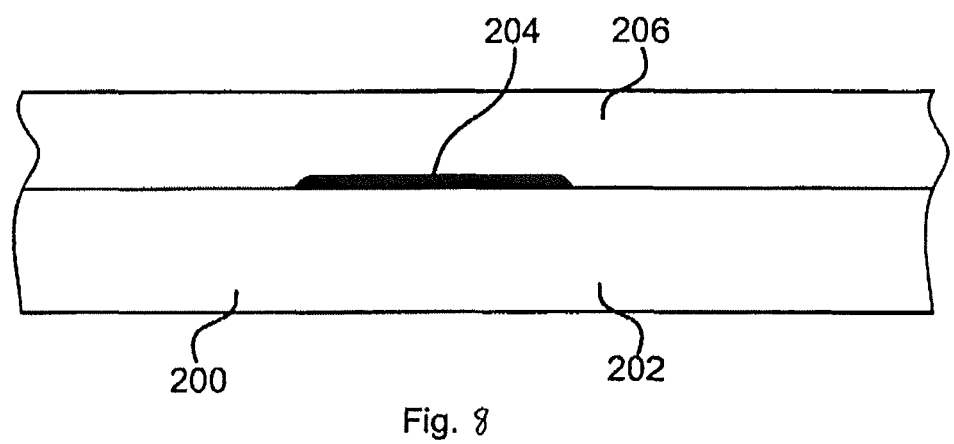
FIG. 8 illustrates an example of laminate structure of a packaging material.

FIG. 8 illustrates that the packing laminate 200 can comprise a layer of paper 202, directly on the surface of which the printing of the magnetisable portions 204 can be made, and one or more layers of plastic coating 206, preferably polyolefin, such as low density polyethylene. Here, the term plastic coating should be construed as any coating or film including suitable polymers for food containers. The packing laminate can also comprise a gas barrier layer, such as a film layer of a barrier polymer, e.g. EVOH, PA, PET, but preferably a metal foil layer such as an aluminium foil which makes the packaging material heat sealable through induction heating which is a rapid efficient sealing technique. Furthermore, to be able to write and read the magnetic mark through such a metal foil layer, the metal is preferably non-ferromagnetic, such as aluminium.

The print of the magnetisable portions is made on a side of the layer it is printed on of the laminate facing towards the intended interior of the package to be formed. Thus, it does not interfere with exterior printing of e.g. decorations or product information on the package. The print is preferably made by using a magnetisable ink as will be demonstrated below, and such that the print becomes between 4 and 10 µm in thickness when dried, preferably between 6 and 8 µm.

A magnetisable ink is provided such that the magnetisable portions can be provided on the packaging laminate, which packaging laminate is to be used for forming e.g. food packages such as beverage and food containers, or containers for basic or additive products for preparing food or beverages. The ink comprises magnetisable particles for provision of the magnetic features of the magnetisable portions.

The ink further comprises a solvent. Purpose of the solvent can be to keep a system for distributing the ink at printing flowing and open. The solvent can be water-based or monomer-based. Examples on solvents are ethanol, ethylic acetate, water, iso-propanol, glycol, or a retarder solvent.

The ink further comprises a binder, such as acrylate, styrene acrylic copolymer, polyurethane, nitrocellulose, polyamide, or latex. The binder can comprise a mix of several components, e.g. of those mentioned above, in order to give the ink needed properties. The properties to be considered are help to disperse and stabilise magnetic particles in the ink, to transport the magnetic particles during a printing process, to give adhesion to a substrate on which the print is made, i.e. on a layer of the laminate. Further properties to be considered are protection of the magnetic particles after printing and providing proper printing properties. For example, one component of the binder can serve as a dispersant for dispersing the magnetic particles evenly in the ink, while another can serve as and adhesive to the laminate, etc. For providing an ink that is suitable for high speed printing, the amount of binder can be between 20 and 60 percent of the weight of the ink, i.e. wet weight. A suitable amount has been found to be between 40 and 60 percent. Using between 50 and 55 percent has worked well.

The ink can further comprise additives, such as waxes and/or antifoaming agent. Suitable waxes can be polyethylene, polypropylene or polytetrafluoro ethylene, silicone, polyamide, ethylene vinyl acetate, ethylene butyl acetate, ethylene acrylic acid, etc. The amount of wax may be varied, but should be enough to prevent the ink from setting-off or smudge. Suitable antifoaming agents can be silicone or mineral oils. The amount of antifoaming agent should be enough for preventing the ink from foaming during printing on the moving web, especially at high-speed printing.

The ink can be prepared by mixing the magnetisable particles with the binder, e.g. by continuous shearing or stirring. The adding of particles, which may be made in portions, may be interrupted when the mix reaches about 40 to 50 degrees centigrade, and immediately adding any additives, e.g. the antifoam agent and/or the waxes, and the fluid such that the ready-to-use ink is provided.

The magnetisable particles can be maghemite or magnetite, or a combination thereof. These minerals are suitable for food packages since there is no restriction whether they may be in contact with the foodstuffs. The amount of magnetisable particles is between X and Y percent weight of the ink, preferably The size of the magnetisable particles, i.e. a length across the particle, a diameter, etc. depending on the assumed shape of the particle, has been found to give more or less beneficial properties of a remaining magnetic field when a magnetic mark is applied on a detectable magnetisable portion printed by the magnetisable ink. Smaller particles, i.e. in the magnitude of 0.1 µm, may be more dispersed, but each particle can of course hold less remaining magnetic field. Also, depending on the choice of binder, solvent, etc., the dispersion of such small particles may in practice be an issue, where lumping of the small particles may be an issue during preparation and handling of the ink. On the other hand, larger particles, i.e. in the magnitude of one or a few µm, may of course not be that dispersed as the smaller particles, but each particle can hold more remaining magnetic field, and the lumping of particles will be less apparent. A further increase of particle size has been found not to increase the aggregate remaining magnetic field that can be held with the amount of ink of the detectable magnetisable portions kept constant. Thus a suitable the size of the magnetisable particles can be between 0.1 and 2.5 µm. Preferable sizes can be between 1 and 8 µm for one embodiment, or between 0.4 and 1.5 µm for a further embodiment. A small particle approach can for example be having particles with a size of about 0.3 µm to provide a suitable trade-off between dispersion and the issue of lumping. Another approach can be to have particles with a size of about 1 µm to enable each particle to provide a significant amount of magnetic field and to minimize the issue of lumping. A further embodiment can be to have a particle size of about 0.4, 0.5, 0.6 or 0.7 µm to provide a little of both of the benefits for the two other examples given above. Here, the size given as "about" should be interpreted in the light of both that the shape of the particles may not give a certain geometric distance to measure, and that there is a natural spread in the sizes of the particles due to the preparation of them. Say for example that a particle size of a half micrometer is chosen, but the particles are prepared by grinding and have a slightly irregular shape. Thus, an average particle can then be a half micrometer across its largest available direction, while it only is 0.35 µm across its smallest direction. Further, for the largest direction, 80 percent of the particles may have a spread between 0.45 and 0.55 µm, while the remaining 20 percent may be out of that range, especially towards smaller particles caused by the grinding. The example is of course applicable for any chosen size. The spread can also be decreased by screening the particles after grinding.

Figure 9:
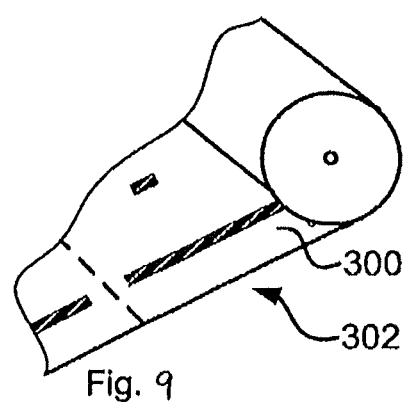
FIG. 9 schematically illustrates a web of packaging laminate according to an embodiment with regard to positions of magnetisable portions.
Figure 10:
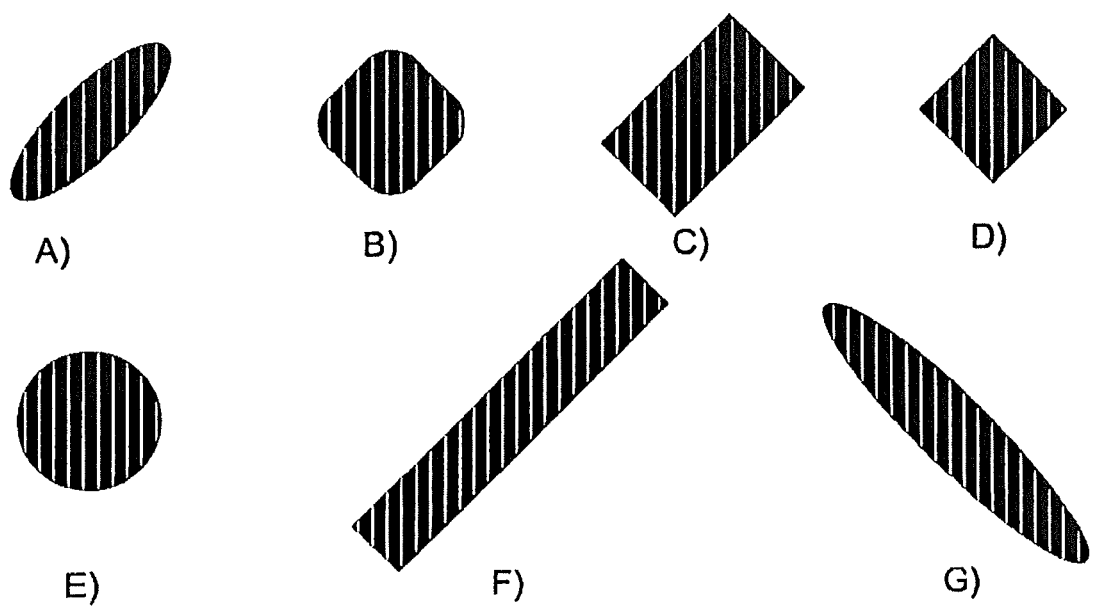
FIG. 10 illustrates different examples of shapes of magnetisable portions.

FIG. 9 illustrates a web of packaging material 300, comprising a plurality of magnetisable portions 302. The magnetisable portions can be distributed such that there is at least one or more magnetisable portions per package to be formed from the packaging material 300. The magnetisable portions comprise magnetisable particles, e.g. provided by a magnetic ink as demonstrated above. The magnetisable portions or "detectable magnetisable portions" can have a variety of shapes, as illustrated in FIG. 10, depending on the magnetic mark and the intention of the magnetic mark it is supposed to carry. The detectable magnetisable portions can be square, rectangular, circular, oval, or have an elongated shape being oriented in a longitudinal or transversal direction of the web. The size of the detectable magnetisable portion is chosen depending on the size of the mark it is supposed to carry. Preferably, the size of the detectable magnetisable portion is slightly larger to alleviate any problem in positioning deviation between printing of the detectable magnetisable portion and providing the magnetic mark to it. A larger detectable magnetisable portion is of course able to carry more magnetisation, which can be used for increasing magnetic field of a low-information carrying mark which thus will be easier to read, especially under harsh signal conditions, or be provided with more complex information, such as carrying information about the web or the particular part of the web. For a low-information carrying mark, the detectable magnetisable portion can have an area of 250 mm$^2$ or less, which for a square detectable magnetisable portion equals a side of about 15-16 mm, or a circular detectable magnetisable portion with a diameter of about 17-18 mm. For many applications, an area of 150 mm$^2$ or less is enough, and for some applications, an area of 25 mm$^2$ or even less may be sufficient. A magnetisable portion for carrying complex data, an elongated detectable magnetisable portion or bar can be suitable. By providing the elongated portion such that it stretches along a longitudinal direction of the web, sequential writing and reading of the complex data is neatly enabled as the web moves during manufacturing of the web and/or finishing of the packages.

The printed detectable magnetisable portions preferably comprise an amount of magnetic particles of between 0.5 and 4 g per m$^2$ detectable magnetisable portion area. Lower amounts may reduce ability to provide the magnetic information, and higher amounts may only increase consumption of magnetisable ink without improving the information carrying abilities. Printing larger amounts may also be a problem, especially at high-speed printing, since the ink may cause problems with setting-off. A preferable amount is between 1.5 and 4 g per m$^2$ to ensure information carrying abilities under various conditions. A fair trade-off of secure reading/writing, printing, and economy in ink consumption gives about 2 g per m$^2$.

The positioning of an elongated detectable magnetisable portion or bar can be positioned a predetermined distance from a longitudinal border of the web, wherein the data provided in the bar also can be used for alignment of the web in some applications.

The elongated detectable magnetisable portion or bar can be part of a strip along the web, being piecewise divided such that there is one part present for each package to be formed. The division is preferably positioned such that sealing of the package to be formed is enabled at the position of the division where there is no magnetisable print. The strip can have a magnetic mark indicating the sealing position by being arranged at a predetermined distance from the sealing position.

Figure 11:
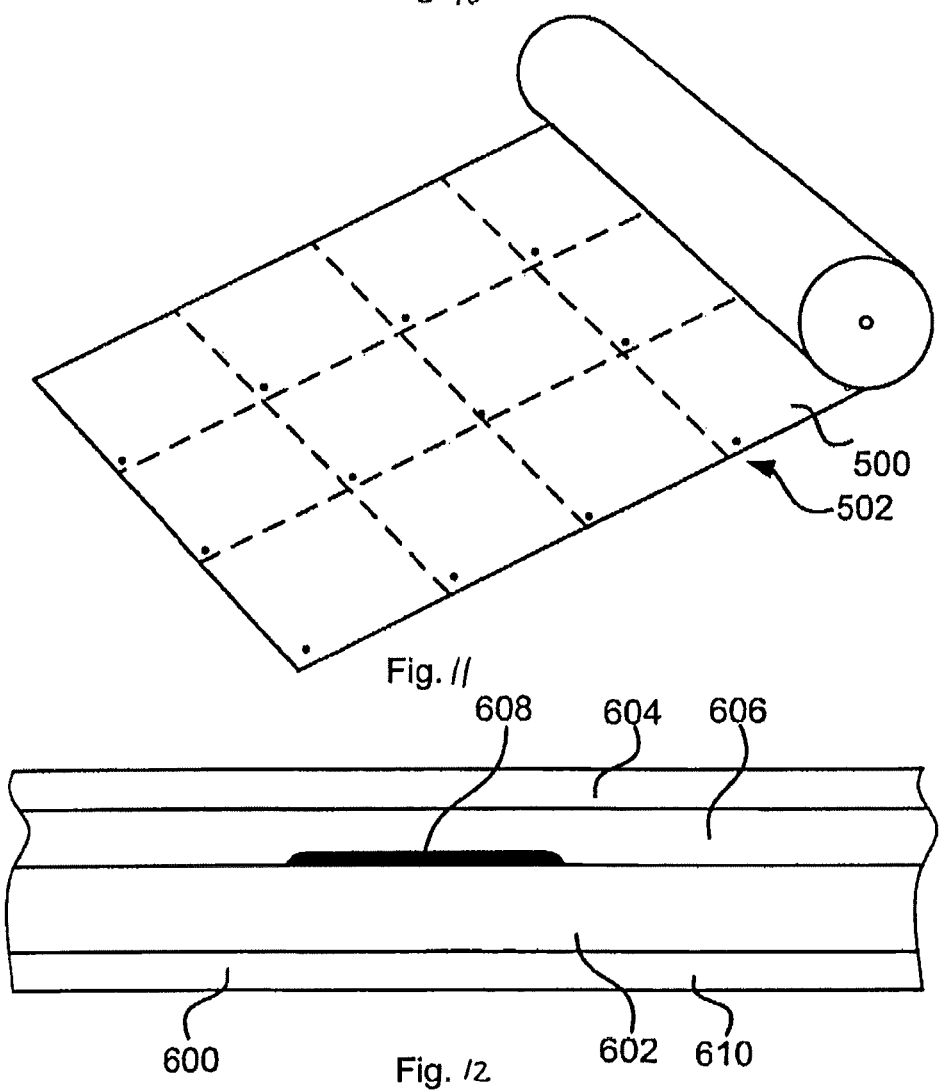
FIG. 11 schematically illustrates a web of packaging laminate according to an embodiment.

FIG. 11 illustrates a web 500 of packaging laminate comprising a plurality of magnetisable portions 502 thereon, here illustrated as dots. The web 500 is intended to form a plurality of packages for packaging of e.g. food or liquids. The dashed lines are imaginary and are intended to show the plurality of parts that will form the packages. The web 500 comprises at least one magnetisable portion per package. Thus, when the packages are formed from the packaging laminate, each package will have at least one magnetisable portion each. The detectable magnetisable portions preferably have any suitable combination of features according to what have been demonstrated above with reference to the geometry, printing, and the magnetisable ink.

Figure 12:
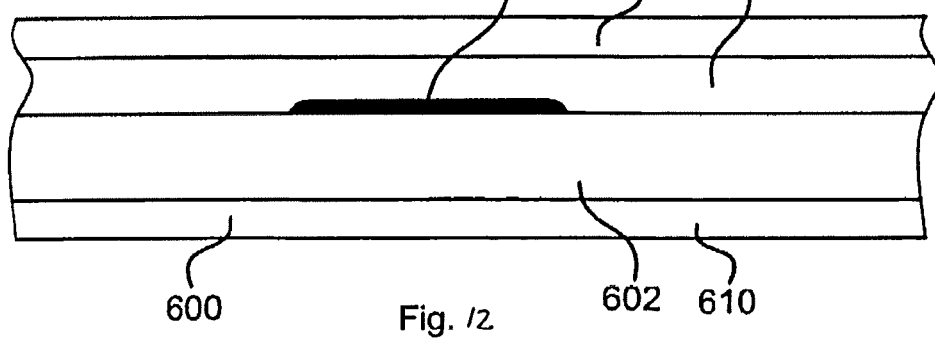
FIG. 12 illustrates an example of laminate structure.

The laminate can be a complex laminate comprising a plurality of layers, where each layer is selected for providing the final package the desired properties. For example, a further polymer layer 610 can be provided, e.g. to protect the paper layer from moisture, make the final package easier to handle and more rough to exposure form the environment, and/or simply to make the final package have a nicer appearance. The laminate can also comprise a single layer, although denoted as a laminate, if that provides the final package its desired properties, such as a single polymer layer. The laminate 600 can comprise a first layer 602 of paper and a second layer 604 of plastic coating, as illustrated in FIG. 12. The magnetisable portions can then be prints 608, e.g. in form of the detectable magnetisable portions or other shapes as demonstrated above with reference to the geometry, made on the layer of paper. There can also be further layers, such as a third layer 606 of metal foil. Further or fewer layers of different materials can be provided to give the desired properties of the final package. When the laminate comprises a metal foil layer 606, it is preferably made of a non-ferromagnetic metal, such as aluminium, such that the magnetisable portion is electromagnetically accessible through the metal foil for printing and reading of the magnetically stored information and/or position.

At least some detectable magnetisable portion of that/those which is/are present on each package is printed such that it is not detectable from outside on the final package. That can for example be for the reason that the exterior of the package should be available for decoration and/or product information. Thus, the print is preferably made on the side of the web intended to face to the interior of the package, or at least on the side of a suitable layer, such as the paper layer as demonstrated above, intended to face towards the interior of the package.

Figure 13:
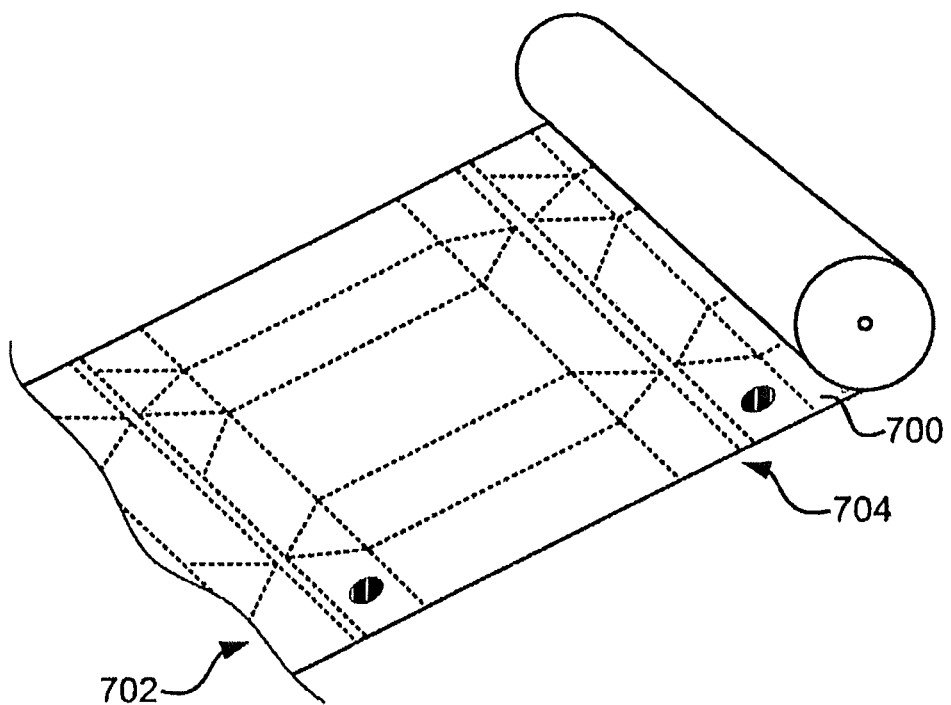
FIG. 13 schematically illustrates a web of packaging laminate according to an embodiment.

FIG. 13 illustrates a web 700 of packaging material comprising a plurality of magnetisable portions 702 thereon. The web 700 comprises at least one detectable magnetisable portion per package to be formed from the packaging material. Further, at least one preparation feature for enhancing finishing of packages is provided by the web. The at least one preparation feature is aligned with a magnetic field mark in the at least one magnetisable portion. For example, as illustrated in FIG. 7, crease lines are made in the web for enabling a swift and reliable finishing of the package. Upon making the crease lines, a mark, formed as a predefined magnetic field, in the magnetisable portion simultaneously with the making of the crease lines. The mechanism for making the crease lines, i.e. rolls with patterned grooves/protrusions, can be provided with a magnetising element. The magnetic mark will then be ensured to be aligned with the crease line making operation. The magnetising element can be a permanent magnet, or an electromagnet, for providing the magnetic field mark. When the magnet provided at the periphery of a crease roll comes in close vicinity of the magnetisable portion, the magnetisable particles of the magnetisable portion will be magnetised, and a magnetic field pattern will remain at the magnetisable portion. Thus, a magnetic field mark is provided. Preferably, the magnetisable portion is slightly larger than the geometric size of the magnetic field mark, i.e. the part of the magnetisable portion having a remaining magnetism. Thereby, the alignment of the magnetisable portion is not crucial as the magnetic field mark will be the element providing an accurate position, and not the print of the magnetisable portion itself. By provision of a suitable magnetic pattern, the accurate magnetic field mark can also be accurately read, as will be discussed further below.

The preparation feature can be other than provision of crease lines, such as providing openings, perforations, etc. The alignment follows the same principle, i.e. that the magnetising portion is provided at the mechanism providing the preparation feature such that the alignment will be inherent because of the structure.

The application of the magnetising element in the mechanism performing the preparation feature may arise a few issues. The magnetising element may for example not be provided at a position where the preparation feature demands a mechanical interaction with the packaging laminate, such as forming a crease line or punching a hole. Therefore, there is preferably provided a distance between an area of such a preparation feature and its aligned magnetic field mark. Further, the tool performing the interaction as mentioned above may be made of a ferromagnetic material. To improve the application of the magnetic field mark, the magnetising element may need to be provided with a holding or mounting means made of a non-ferromagnetic material, such as aluminium, wherein the distance may be further increased. Thus, depending on the preparation feature operation, and the tool for performing it, the distance is preferably for example at least 5 mm, at least 7 mm, or at least 10 mm.

As several operations performing feature preparations, it is preferable that each such operation have its aligned magnetic field mark. Those different magnetic field marks are each preferably made in a respective magnetisable portion adapted in position for the operation. As some operations may be interacting, one operation can use a magnetic field mark made by another operation as a master mark, or there may be provided a certain dedicated master mark that is not inherently aligned with any feature preparation operation, which thus only is used for reference by later performed operations.

Other magnetic field marks may hold complex data, and can for example be provided as long rectangular detectable magnetisable portions, i.e. as strips. The strips can be provided along the entire web, with or without interruptions at parts intended to be cut upon finishing the packages. The magnetic field marks holding complex data can for example provide a unique code from which the web, and also the part of the web, can be identified. The complex data can also give position information, indications for the finishing of the package, etc.

Figure 14:
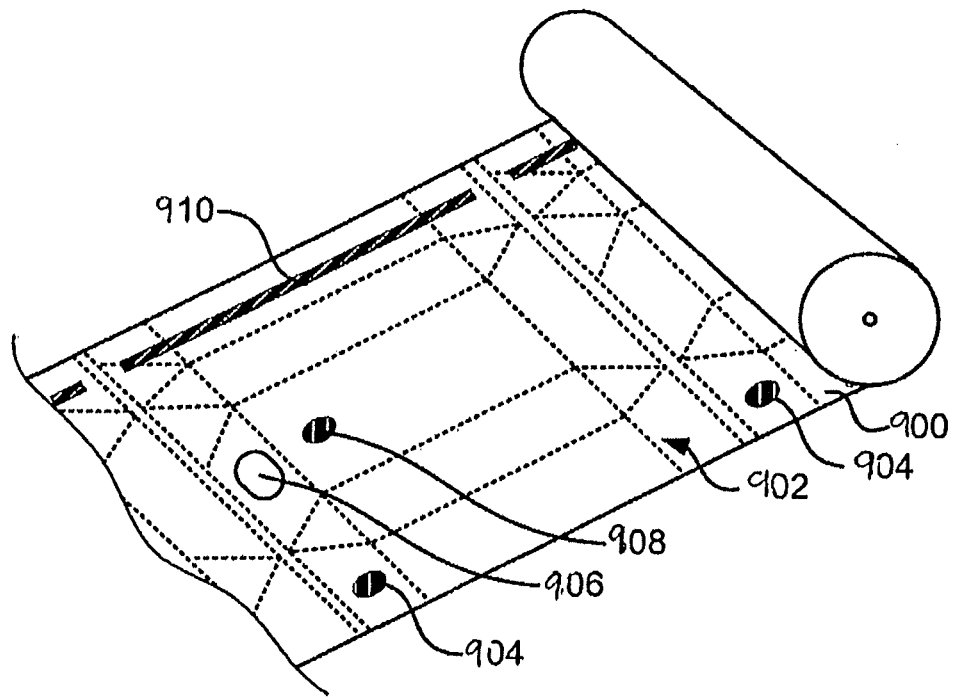
FIG. 14 schematically illustrates a web of packaging laminate according to an embodiment.

FIG. 14 illustrates an example of a web 900 comprising crease lines 902 and magnetisable portion 904 holding position information for the crease lines by an aligned magnetic field mark. The web 900 also comprises a punched hole 906 for each package to be formed, and a magnetisable portion 908 holding position information for the respective punched hole 906 by an aligned magnetic field mark. This magnetic field mark can for example be used upon moulding a reclosable opening on the package upon finishing. The web 900 also comprises a strip 910 holding complex data, for example as elucidated above.

A further position information can be package boundary or sealing, where an operation is for dividing the web into the parts forming the package, or for the sealing of respective package.

A further position information, that the magnetisable portion can hold, is magnetic position marks at ends of a web of the packaging material, i.e. beginning of web and/or end of web, such that, at splicing of the webs, the splice is enabled to be aligned.

A further position information is positioning of an optical mark, which may beneficial compatibility for packaging machines having either optical reading or magnetic reading of positioning information. Preferably, the position of the detectable magnetisable portion holding this information is positioned similar to the optical mark, but on the side that is intended to become the inside of the package. Since the optical mark normally is provided on the part intended to form the bottom of the package, the corresponding magnetisable portion is positioned accordingly. A magnetic mark at this magnetisable portion is thus enabled to provide the similar information as the optical mark, and the optical reader of a packaging machine can thus simply be replaced with a magnetic reader. In practise, no optical mark is thus necessary if the optical readers are replaced by magnetic readers, and the magnetic mark takes the place of the optical mark as described above. In that case, the compatibility lies in the sense of the same mounting position of the readers in the packaging machine.

A further position information can be for a print for the package outside. This position information can be beneficial for ensuring proper alignment of the print with the package, and with other feature preparations of the package.

Upon making the magnetic field mark, it can be beneficial that the means for writing the magnetic field mark, e.g. a permanent magnet or a electromagnet arrangement, has no or little relative movement, or at least an approximately constant relative movement to the magnetisable portion. This is achieved for example by integrating the writing means in e.g. rolls for making the crease lines, wherein there is no relative movement since the periphery of the rolls and the web moves by the same speed in the same direction. Another way of achieving no or little relative movement, or at least an approximately constant relative movement to the magnetisable portion is to control the movement at the position of the writing. This can be done by having a slacking portion of the web both before and after the writing position such that speed at this position can be controlled irrespective of the speed of the web before and after that position. The slack can be achieved by letting the web move along a wave-formed path where the sizes of the waves are adaptable to give a variable slack. Thus, during the writing operation, the speed can be controllable at the writing position, and the web is accelerated or decelerated between the writing operations to adapt to the average speed of the web.

At least one of the detectable magnetisable portions for each package to be formed can be positioned not more than 20%, preferably between 5 and 15% of the width of the material to form a package from a longitudinal edge of the material to form the package, as explained before. A magnetic field mark at such detectable magnetisable portions can then be used for controlling twisting of the material when forming the package. The forming of the package is normally made by forming some kind of tube which then is sealed in some way at its ends and formed into the desired shape. The tube can then be unintentionally twisted, which can jeopardize the forming of the package. Therefore, such a magnetic field mark can help to control any twisting of the tube to ensure forming of the package. By having these magnetic marks relatively close to the longitudinal edges to be joined to form the tube, the control is further enhanced since the reading of the magnetic field marks can be made from the side of the package where the joining takes place.

Figure 15:
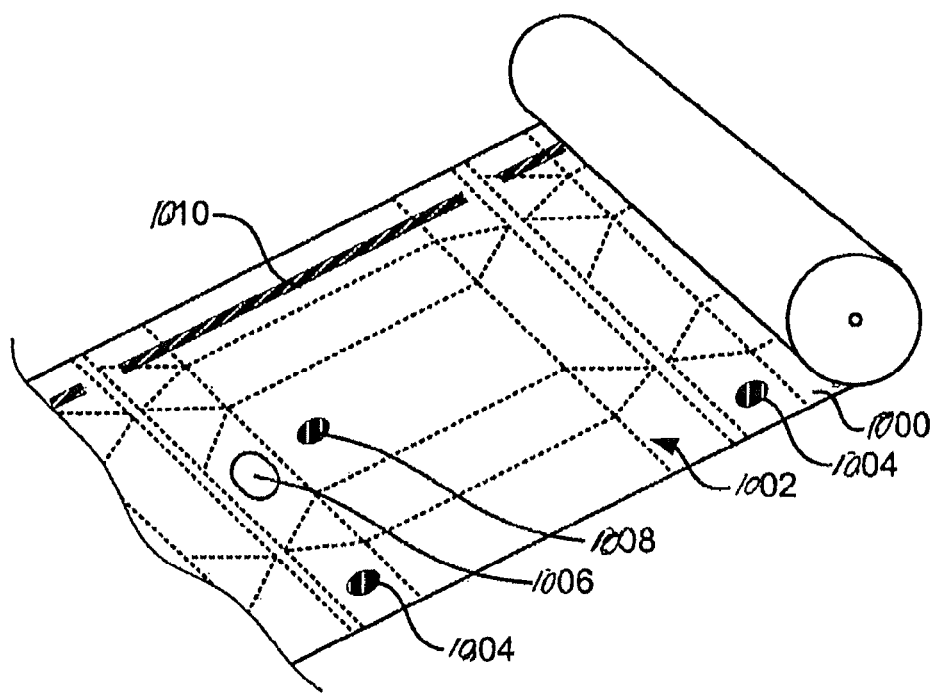
FIG. 15 schematically illustrates a web of packaging laminate according to an embodiment.

A web of packaging material, such as a laminate, comprises a plurality of magnetisable portions 1004, 1006, 1010 thereon, as illustrated in FIG. 15. The web comprises at least one detectable magnetisable portion 1004 per package to be formed from the packaging laminate. Further, at least one preparation feature for enhancing finishing of packages is provided by the web. The at least one preparation feature is aligned with a magnetic field mark in the at least one magnetisable portion. For example, as illustrated in FIG. 15, crease lines 1002 are made in the web 1000 for enabling a swift and reliable finishing of the package. Upon making the crease lines 1002, a mark 1008, formed as a predefined magnetic field, in the magnetisable portion simultaneously with the making of the crease lines. The mechanism for making the crease lines, i.e. rolls with patterned grooves/protrusions, can be provided with a magnetising element. The magnetic mark 1004 will then be ensured to be aligned with the crease line making operation. The magnetising element can be a permanent magnet, or an electromagnet, for providing the magnetic field mark. When the magnet provided at the periphery of a crease roll comes in close vicinity of the magnetisable portion, the magnetisable particles of the magnetisable portion will be magnetised, and a magnetic field pattern will remain at the magnetisable portion. Thus, a magnetic field mark is provided. Preferably, the magnetisable portion is slightly larger than the geometric size of the magnetic field mark, i.e. the part of the magnetisable portion having a remaining magnetism (remanence). Thereby, the alignment of the magnetisable portion is not crucial as the magnetic field mark will be the element providing an accurate position, and not the print of the magnetisable portion itself. By provision of a suitable magnetic pattern, the accurate magnetic field mark can also be accurately read, as will be discussed further below. The preparation feature can be other than provision of crease lines, such as providing openings, perforations, etc. The alignment follows the same principle, i.e. that the magnetising portion is provided at the mechanism providing the preparation feature such that the alignment will be inherent because of the structure.

The application of the magnetising element in the mechanism performing the preparation feature may arise a few issues. The magnetising element may for example not be provided at a position where the preparation feature demands a mechanical interaction with the packaging laminate, such as forming a crease line or punching a hole. Therefore, there is preferably provided a distance between an area of such a preparation feature and its aligned magnetic field mark. Further, the tool performing the interaction as mentioned above may be made of a ferromagnetic material. To improve the application of the magnetic field mark, the magnetising element may need to be provided with a holding or mounting means made of a non-ferromagnetic material, such as aluminum, wherein the distance may be further increased. Thus, depending on the preparation feature operation, and the tool for performing it, the distance is preferably for example at least 2 mm, at least 5 mm, at least 7 mm, or at least 10 mm. As several operations performing feature preparations, it is preferable that each such operation has its aligned magnetic field mark. Those different magnetic field marks are each preferably made in a respective magnetisable portion adapted in position for the operation. As some operations may be interacting, one operation can use a magnetic field mark made by another operation as a master mark, or there may be provided a certain dedicated master mark that is not inherently aligned with any feature preparating operation, which thus only is used for reference by later performed operations.

Other magnetic field marks may hold complex data, and can for example be provided as long rectangular detectable magnetisable portions 1010, i.e. as strips. The strips 1010 can be provided along the entire web 1000, with or without interruptions at parts intended to be cut upon finishing the packages. The magnetic field marks holding complex data can for example provide a unique code from which the web, and also the part of the web, can be identified. The complex data can also give position information, indications for the finishing of the package, etc.

Upon making the magnetic field mark, it can be beneficial that the means for writing the magnetic field mark, e.g. a permanent magnet or a electromagnet arrangement, has no or little relative movement, or at least an approximately constant relative movement to the magnetisable portion. This is achieved for example by integrating the writing means in e.g. rolls for making the crease lines, wherein there is no relative movement since the periphery of the rolls and the web moves by the same speed in the same direction. Another way of achieving no or little relative movement or at least an approximately constant relative movement to the magnetisable portion is to control the movement at the position of the writing. This can be done by having a slacking portion of the web both before and after the writing position such that speed at this position can be controlled irrespective of the speed of the web before and after that position. The slack can be achieved by letting the web move along a wave-formed path where the sizes of the waves are adaptable to give a variable slack. Thus, during the writing operation, the speed can be controllable at the writing position, and the web is accelerated or decelerated between the writing operations to adapt to the average speed of the web.

Figure 16:
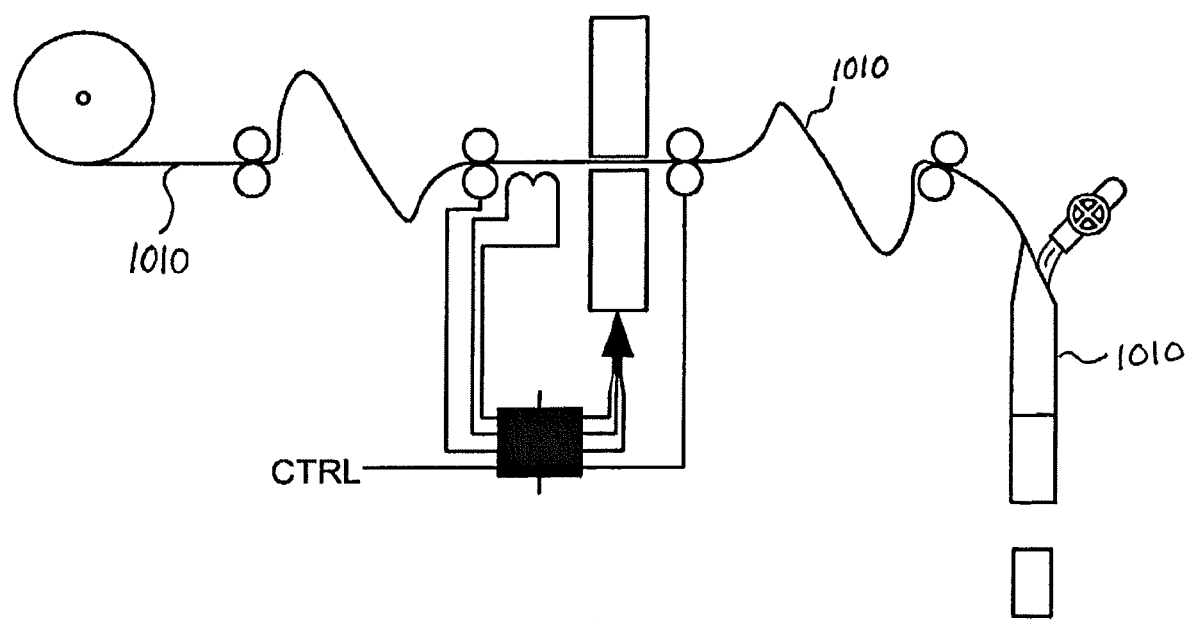
FIG. 16 schematically illustrates finishing of packages according to an embodiment.

The material is suitable for forming a tube to be sealed at one end, filled with content, sealed again to enclose the content, cut, and formed to a package, as schematically illustrated in FIG. 16. The magnetic mark has been found particularly suitable for solving a problem within that art. A magnetic mark is arranged such that any twist when forming the tube 1011 is enabled to be detected. By being able to detect any twist of the tube 1011 when making and filling the packages, which is performed at a high pace, a correction is enabled, which can greatly enhance operation and increase yield in terms of properly formed, filled and sealed packages. The packaging operation as demonstrated above put certain demands on any additional operation. The inventors have found that it is a great benefit of being able to access the tube at the region of the joint of the edges of the packaging material. Therefore, at least one of the detectable magnetisable portions for each package to be formed, which then can be neatly used for determining of twist, is preferably positioned not more than 20% from the edges. Thereby, access is mostly enabled during operation of such packaging. For certain forms of packages within that art, it is preferable to have that detectable magnetisable portion between 5 and 15% of the width of the material from the edge.

A magnetic field mark at such detectable magnetisable portions can then be used for controlling twisting of the material when forming the package. The forming of the package is normally made by forming some kind of tube which then is sealed in some way at its ends and formed into the desired shape. The tube can then be unintentionally twisted, which can jeopardize the forming of the package. Therefore, such a magnetic field mark can help to control any twisting of the tube to ensure forming of the package. By having these magnetic marks relatively close to the longitudinal edges to be joined to form the tube, the control is further enhanced since the reading of the magnetic field marks can be made from the side of the package where the joining takes place.

The magnetic field pattern can comprise a first magnetic field peak having a first polarity and a second magnetic field peak having a second opposite polarity. Such a magnetic field pattern can be achieved by a single magnet, e.g. a permanent magnet having a north and a south pole, being arranged close to the magnetisable portion during application of the magnetic mark, such that the remaining magnetic field (remanence) of the magnetic particles of the magnetic ink of the magnetisable portion becomes as desired. The position in a longitudinal direction is then preferably detected by observing the shift of the magnetic field, e.g. zero-crossing, which can provide a very accurate position indication in the longitudinal direction. The position in a transversal direction is preferably detected by observing flanks of the magnetic field, e.g. by differential measurements technique, which will enable accurate tracking in the transversal direction.

The pattern illustrated is preferably aligned with the longitudinal or transversal direction. However, such a perfect alignment is not necessary. Considering an imaginary line between a midpoint of the first peak and the second peak of the magnetic field pattern, the magnetic field pattern can be arranged such that the angle between the imaginary line and e.g. the longitudinal direction is between −10 and 10 degrees. In a preferred embodiment, the angle is between −5 and 5 degrees. The peaks of the magnetic pattern can have a distribution forming a substantially constant magnetic field along a width of the magnetic pattern in a direction perpendicular to the imaginary line, and forming a strongly decreasing magnetic field outside the width of the magnetic pattern in the direction perpendicular to the imaginary line. The width is preferably at least 2 mm to enable detection of the flanks without interference. For higher reliability, the width is preferably at least 4 mm, and for some applications preferably at least 6 mm.

According to another embodiment of assignment of magnetic field pattern, the magnetic field pattern comprises a first magnetic field peak having a first polarity and a second magnetic field peak being distributed such that it encircles the first peak and having a second opposite polarity. Observing this magnetic field pattern in longitudinal and transversal directions will show the symmetric properties of the magnetic field pattern. Thus, detection according to the same principle can be made in any direction. For example, zero-crossings of the magnetic field can be observed using differential measurement technology. Another example is simply observing a main center peak of the magnetic field pattern.

Figure 17:
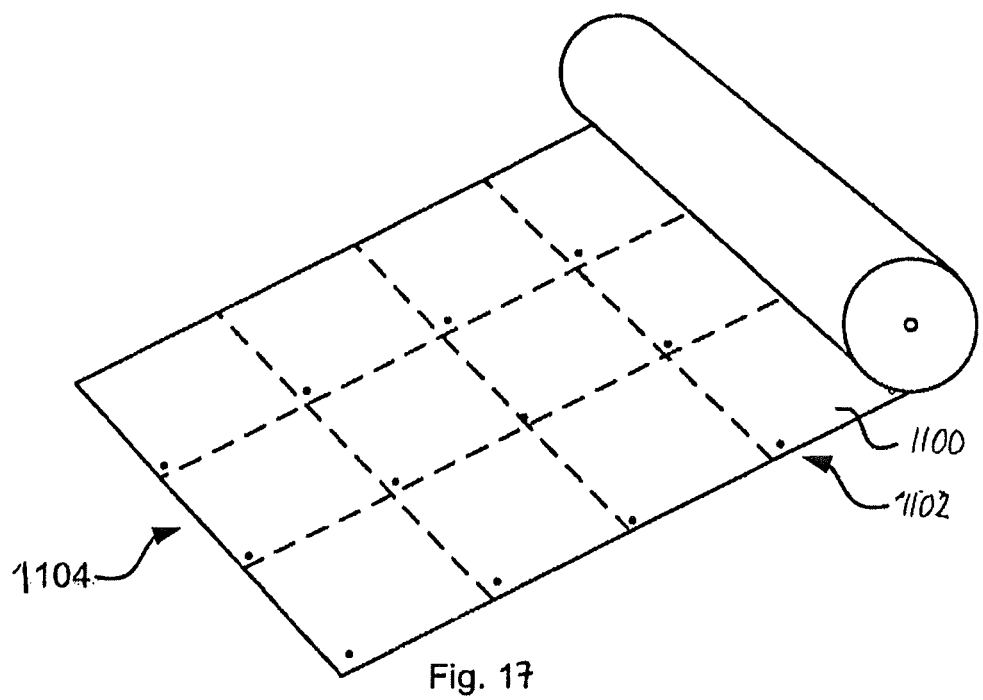
FIG. 17 schematically illustrates a web of packaging laminate according to an embodiment.

FIG. 17 illustrates web 1100 of packaging material, where a plurality of magnetisable portions 1102 are provided. The magnetisable portions are preferably distributed upon printing them such that there is at least one magnetisable portion 1102 per package 1104 to be formed from the packaging material. The dashed lines are imaginary and are intended to show the plurality of parts that will form the packages. For reducing the consumption of magnetisable material, e.g. magnetisable ink consumption, the magnetisable portions are provided as detectable magnetisable portions or the like at parts where magnetic marks are intended to be positioned. Since there is a limited precision in positioning between printing and the assignment of the magnetic mark, cf. the problem with optical marks, the detectable magnetisable portions are preferably slightly larger than the actual size needed for the magnetic mark. Thus, any reasonable deviation can be handled. The detectable magnetisable portions are thus provided with magnetisable particles, which can be provided with magnetic marks, and, as will be further elucidated below, depending on the form and size of the detectable magnetisable portions, be provided with more complex information by modulated magnetisation. The packaging material is preferably a laminate, or a single layer material such as a polymer material.

Figure 18:
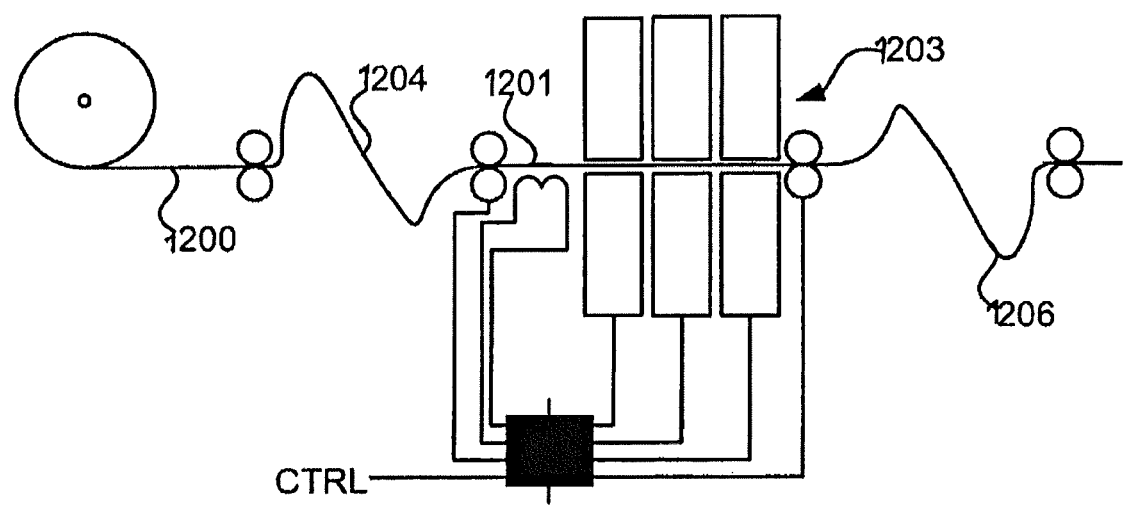
FIG. 18 schematically illustrates an example of position reading/writing aligned with operations on a web of packaging material.

FIG. 18 schematically illustrates an example of position reading/writing of a magnetic mark aligned with one or more operations 1203 on a web 1200 of packaging material. A magnetic mark 1201 is used for alignment of the one or more operations. To enable proper positioning of the webs for the operations, and to provide a constant movement, i.e. without accelerations or decelerations of the material, or a zero movement, slacks 1204, 1206 before and after the position of reading/writing/operations can be provided.

Further, at least one preparation feature for enhancing finishing of packages can be provided by the web. The at least one preparation feature can be aligned with a magnetic field mark in the at least one magnetisable portion. For example, crease lines are made in the web for enabling a swift and reliable finishing of the package. The preparation feature can be other than provision of crease lines, such as providing openings, perforations, etc. The alignment follows the same principle, i.e. that the magnetising portion is provided at the mechanism providing the preparation feature such that the alignment will be inherent because of the structure.

The application of the magnetising element in the mechanism performing the preparation feature may arise a few issues. The magnetising element may for example not be provided at a position where the preparation feature demands a mechanical interaction with the packaging laminate, such as forming a crease line or punching a hole. Therefore, there is preferably provided a distance between an area of such a preparation feature and its aligned magnetic field mark. Further, the tool performing the interaction as mentioned above may be made of a ferromagnetic material. To improve the application of the magnetic field mark, the magnetising element may need to be provided with a holding or mounting means made of a non-ferromagnetic material, such as aluminium, wherein the distance may be further increased. Thus, depending on the preparation feature operation, and the tool for performing it, the distance is preferably for example at least 2 mm, at least 5 mm, at least 7 mm, or at least 10 mm.

As several operations performing feature preparations, it is preferable that each such operation have its aligned magnetic field mark. Those different magnetic field marks are each preferably made in a respective magnetisable portion adapted in position for the operation. As some operations may be interacting, one operation can use a magnetic field mark made by another operation as a master mark, or there may be provided a certain dedicated master mark that is not inherently aligned with any feature preparation operation, which thus only is used for reference by later performed operations.

Other magnetic field marks may hold complex data, and can for example be provided as long rectangular detectable magnetisable portions, i.e. as strips. The strips can be provided along the entire web, with or without interruptions at parts intended to be cut upon finishing the packages. The magnetic field marks holding complex data can for example provide a unique code from which the web, and also the part of the web, can be identified. The complex data can also give position information, indications for the finishing of the package, etc.

A further position information can be package boundary or sealing, where an operation is for dividing the web into the parts forming the package, or for the sealing of respective package.

A further position information, that the magnetisable portion can hold, is magnetic position marks at ends of a web of the packaging material, i.e. beginning of web and/or end of web, such that, at splicing of the webs, the splice is enabled to be aligned.

A further position information is positioning of an optical mark, which may beneficial compatibility for packaging machines having either optical reading or magnetic reading of positioning information. Preferably, the position of the detectable magnetisable portion holding this information is positioned similar to the optical mark, but on the side that is intended to become the inside of the package. Since the optical mark normally is provided on the part intended to form the bottom of the package, the corresponding magnetisable portion is positioned accordingly. A magnetic mark at this magnetisable portion is thus enabled to provide the similar information as the optical mark, and the optical reader of a packaging machine can thus simply be replaced with a magnetic reader. In practise, no optical mark is thus necessary if the optical readers are replaced by magnetic readers, and the magnetic mark takes the place of the optical mark as described above. In that case, the compatibility lies in the sense of the same mounting position of the readers in the packaging machine.

A further position information can be for a print for the package outside. This position information can be beneficial for ensuring proper alignment of the print with the package, and with other feature preparations of the package.

Upon making the magnetic field mark, it can be beneficial that the means for writing the magnetic field mark, e.g. a permanent magnet or a coil arrangement, has no or little relative movement, or at least an approximately constant relative movement to the magnetisable portion. This is achieved for example by integrating the writing means in e.g. rolls for making the crease lines, wherein there is no relative movement since the periphery of the rolls and the web moves by the same speed in the same direction. Another way of achieving no or little relative movement, or at least an approximately constant relative movement to the magnetisable portion is to control the movement at the position of the writing. This can be done by having a slacking portion of the web both before and after the writing position such that speed at this position can be controlled irrespective of the speed of the web before and after that position. The slack can be achieved by letting the web move along a wave-formed path where the sizes of the waves are adaptable to give a variable slack. Thus, during the writing operation, the speed can be controllable at the writing position, and the web is accelerated or decelerated between the writing operations to adapt to the average speed of the web.

Upon reading the magnetic field mark, it can be beneficial that the means for reading the magnetic field mark, e.g. a coil arrangement, has an approximately constant relative movement to the magnetisable portion. A way of achieving the approximately constant relative movement to the magnetisable portion is to control the movement at the position of the reading. This can be done by having a slacking portion of the web both before and after the reading position such that speed at this position can be controlled irrespective of the speed of the web before and after that position. The slack can be achieved by letting the web move along a wave-formed path where the sizes of the waves are adaptable to give a variable slack. Thus, during the reading operation, the speed can be controllable at the reading position, and the web is accelerated or decelerated between the reading operations to adapt to the average speed of the web.

Thus, there are provided methods for writing and reading, respectively, the magnetic mark according to the discussion above. For writing of the magnetic mark, the benefit of having a zero relative speed between the writing means and the material is that the positioning of the mark can be very accurate, and that the pattern of the mark becomes as intended since there is no slip. For reading of the magnetic mark, the benefit of having a constant non-zero relative speed is that the magnetic pattern of the mark can be properly read. In this context, zero and non-zero should be construed in view of the dynamics of the processes of material movement and the time it takes for reading and writing. Thus, "zero" (and thus "non-zero") is not to be construed as absolute, and not to be construed as a permanent condition since it is only a desired state at the very moment of reading or writing.

At least one of the detectable magnetisable portions for each package to be formed can be positioned not more than 20%, preferably between 5 and 15% of the width of the material to form a package from a longitudinal edge of the material to form the package, as explained before. A magnetic field mark at such detectable magnetisable portions can then be used for controlling twisting of the material when forming the package. The forming of the package is normally made by forming some kind of tube which then is sealed in some way at its ends and formed into the desired shape. The tube can then be unintentionally twisted, which can jeopardize the forming of the package. Therefore, such a magnetic field mark can help to control any twisting of the tube to ensure forming of the package. By having these magnetic marks relatively close to the longitudinal edges to be joined to form the tube, the control is further enhanced since the reading of the magnetic field marks can be made from the side of the package where the joining takes place.

Considering a web of packaging material comprising a plurality of magnetisable portions thereon, wherein at least one detectable magnetisable portion per package to be formed from the packaging laminate is comprised, at least one of the magnetisable portions can provide a magnetic mark carrying a magnetic field pattern. Thus, the magnetic mark becomes an information carrier. The information carried is geometrical in the sense that it is made on a particular position on the web, which is maintained through different processing steps, from manufacturing of the web to the finishing of the package. The information can also be in the sense of a pattern of the magnetic field, which can be a rather simple pattern for reliable position detection, or a more complex pattern for carrying complex data.

The magnetic field pattern can comprise a first magnetic field peak having a first polarity and a second magnetic field peak having a second opposite polarity. Such a magnetic field pattern can be achieved by a single magnet, e.g. a permanent magnet having a north and a south pole, being arranged close to the magnetisable portion during application of the magnetic mark, such that the remaining magnetic field of the magnetic particles of the magnetic ink of the magnetisable portion becomes as desired. The position in a longitudinal direction is then preferably detected by observing the shift of the magnetic field, e.g. zero-crossing, which can provide a very accurate position indication in the longitudinal direction. The position in a transversal direction is preferably detected by observing flanks of the magnetic field, e.g. by differential measurements technique, which will enable accurate tracking in the transversal direction.

The pattern illustrated is preferably aligned with the longitudinal or transversal direction. However, such a perfect alignment is not necessary. Considering an imaginary line between a midpoint of the first peak and the second peak of the magnetic field pattern, the magnetic field pattern can be arranged such that the angle between the imaginary line and e.g. the longitudinal direction is between −10 and 10 degrees. In a preferred embodiment, the angle is between −5 and 5 degrees. The peaks of the magnetic pattern can have a distribution forming a substantially constant magnetic field along a width of the magnetic pattern in a direction perpendicular to the imaginary line, and forming a strongly decreasing magnetic field outside the width of the magnetic pattern in the direction perpendicular to the imaginary line. The width is preferably at least 2 mm to enable detection of the flanks without interference. For higher reliability, the width is preferably at least 4 mm, and for some applications preferably at least 6 mm.

According to another embodiment of assignment of magnetic field pattern, the magnetic field pattern comprises a first magnetic field peak having a first polarity and a second magnetic field peak being distributed such that it encircles the first peak and having a second opposite polarity. Observing this magnetic field pattern in longitudinal and transversal directions will show the symmetric properties of the magnetic field pattern. Thus, detection according to the same principle can be made in any direction. For example, zero-crossings of the magnetic field can be observed using differential measurement technology. Another example is simply observing a main center peak of the magnetic field pattern.

Figure 19:
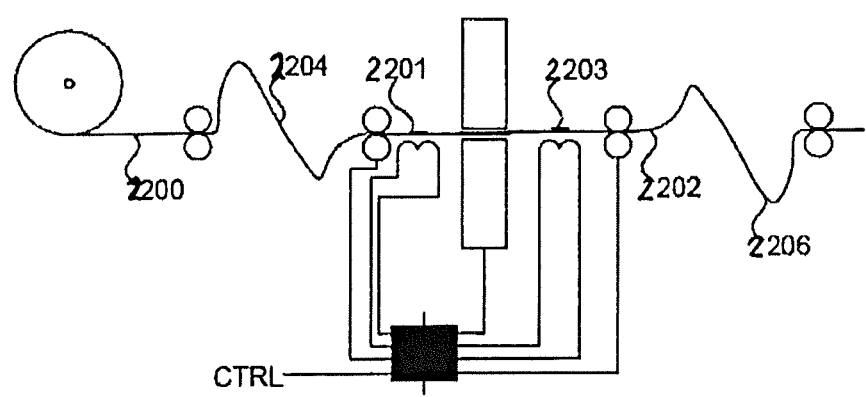
FIG. 19 schematically illustrates an example of splicing two webs of packaging material through the use a magnetic mark.

FIG. 19 schematically illustrates splicing of two webs 2200, 2202 of packaging laminate, where magnetic marks 2201, 2203 are used for alignment of the splicing. To enable proper positioning of the webs for splicing, slacks 2204, 2206 before and after the position of splicing can be provided.

Further, at least one preparation feature for enhancing finishing of packages can be provided by the web. The at least one preparation feature can be aligned with a magnetic field mark in the at least one magnetisable portion. For example, crease lines are made in the web for enabling a swift and reliable finishing of the package. Upon making the crease lines, a mark, formed as a predefined magnetic field, in the magnetisable portion simultaneously with the making of the crease lines. The mechanism for making the crease lines, i.e. rolls with patterned grooves/protrusions, can be provided with a magnetising element. The magnetic mark will then be ensured to be aligned with the crease line making operation. The magnetising element can be a permanent magnet, or an electromagnet, for providing the magnetic field mark. When the magnet provided at the periphery of a crease roll comes in close vicinity of the magnetisable portion, the magnetisable particles of the magnetisable portion will be magnetised, and a magnetic field pattern will remain at the magnetisable portion. Thus, a magnetic field mark is provided. Preferably, the magnetisable portion is slightly larger than the geometric size of the magnetic field mark, i.e. the part of the magnetisable portion having a remaining magnetism. Thereby, the alignment of the magnetisable portion is not crucial as the magnetic field mark will be the element providing an accurate position, and not the print of the magnetisable portion itself. By provision of a suitable magnetic pattern, the accurate magnetic field mark can also be accurately read, as will be discussed further below. Since splicing will be well aligned, these preparation features will still work in the continuous operation of the packaging machine after splicing in a new web.

For compatibility for packaging machines having either optical reading or magnetic reading of positioning information, a magnetic mark can indicate position of an optical mark. Preferably, the position of the detectable magnetisable portion holding this information is positioned similar to the optical mark, but on the side that is intended to become the inside of the package. Since the optical marks normally is provided on the part intended to form the bottom of the package, the corresponding magnetisable portion is positioned accordingly. A magnetic mark at this magnetisable portion is thus enabled to provide the similar information as the optical mark, and the optical reader of a packaging machine can thus simply be replaced with a magnetic reader. In practise, no optical mark is thus necessary if the optical readers are replaced by magnetic readers, and the magnetic mark takes the place of the optical mark as described above. In that case, the compatibility lies in the sense of the same mounting position of the readers in the packaging machine.

A web of packaging laminate comprising a plurality of magnetisable portions thereon, with at least one detectable magnetisable portion per package to be formed from the packaging laminate can carry more or less complex information in its magnetisable portions. Considering that at least one of the magnetisable portions provides a magnetic mark carrying a magnetic field pattern, the magnetic field pattern can provide information both in the way the pattern has, and in the position it has. At least one of the plurality of magnetisable portions can provide a magnetic mark carrying a further magnetic pattern representing complex data, and even further magnetic marks can be provided for carrying information. For example, the complex data can hold information from which the web can be uniquely identified, and even a part of the web can be uniquely identified. The data can be a description of the web and/or the part of the web, or an identifier from which the description can be accessed from a database if the identifier is known. Upon splicing, information about the respective webs can be obtained from complex information containing marks, which information can be used for enhancing the splicing or quality check, e.g. that the right type of material is spliced in. The complex data can be represented as a modulating scheme of the magnetic field of the magnetic pattern. The modulating scheme can be any of phase shift keying, frequency shift keying, amplitude shift keying, quadrature amplitude modulation, and pulse width modulation, preferably phase shift keying as explained above.

The invention claimed is:

1. Packaging material comprising at least one magnetisable portion per package to be formed from the packaging material such that each package possesses a visual exterior, said packaging material comprising a laminate with a layer of paper or paperboard, wherein
   said at least one magnetisable portion is provided directly on one surface of said paper or paperboard layer,
   said at least one magnetisable portion is arranged so as not to interfere with the visual exterior of the package, and
   said at least one magnetisable portion is positioned at a place on the packaging material that is within a joint of overlapping edges of the packaging material when the packaging material is folded and sealed to produce the package,
   wherein said paper or paperboard layer is covered by plastic coatings on each side thereof.

2. Packaging material according to claim 1, wherein said at least one magnetisable portion is provided through a printing operation.

3. Package formed by folding and sealing of the packaging material according to claim 1, wherein said at least one magnetisable portion is provided on that surface of the paper or paperboard layer which is facing inwardly of the package.

4. Package formed by folding and sealing of the packaging material according to claim 1, wherein said at least magnetisable portion is applied through a printing operation.

\* \* \* \* \*